United States Patent [19]
Ran et al.

[11] Patent Number: 5,446,806
[45] Date of Patent: Aug. 29, 1995

[54] QUADTREE-STRUCTURED WALSH TRANSFORM VIDEO/IMAGE CODING

[75] Inventors: Xiaonong Ran, Cupertino; Micheal Van Scherrenburg, Sunnyvale, both of Calif.

[73] Assignee: National Semiconductor Corporation, Santa Clara, Calif.

[21] Appl. No.: 153,322

[22] Filed: Nov. 15, 1993

[51] Int. Cl.$^6$ .............................................. G06K 9/36
[52] U.S. Cl. ................................ 382/240; 358/262.1; 382/246
[58] Field of Search .......................... 382/56, 37, 43; 358/261.3, 427, 261.1, 432, 433, 262.1

[56] References Cited

U.S. PATENT DOCUMENTS

| | | | |
|---|---|---|---|
| 4,831,659 | 5/1989 | Miyaoka | 382/56 |
| 5,060,285 | 10/1991 | Dixit | 382/56 |
| 5,228,098 | 7/1993 | Crinon | 382/37 |

(List continued on next page.)

FOREIGN PATENT DOCUMENTS

WO92/22166  12/1992  WIPO.

OTHER PUBLICATIONS

X. Zhang, et al., "Adaptive Quadtree coding of motion-compensated image sequences for use on the broadband ISDN," *IEEE Transactions on Circuits and Systems for Video Technology*, vol. 3, No. 3, (Jun. 1993), pp. 222-229.

M. M. Anguh and R. R. Martin, "A truncation method for computing Walsh transforms with applications to image processing" *CVGIP: Graphical Models and Image Processing*, vol. 55, No. 6 (Nov. 1993), pp. 482-493.

R. R. Martin and M. M. Anguh, "Quadtrees, transforms and image coding," *Computer Graphics Forum*, vol. 10, No. 2 (Jun. 1991), pp. 91-96.

P. Strobach, "Quadtree-structured recursive plane decomposition coding of images," *IEEE Transactions on Acoustics, Speech and Signal Processing*, vol. 39, No. 6 (Jun. 1991), pp. 1380-1397.

M. F. Carlsohn, "Adaptive WH-transform encoding of pictures by variable subpicture size," *Proceedings of the Second International Conference on New Systems and Services in Telecommunications*, (Nov. 1983), pp. 83-90.

Brown, "A Recursive Algorithm for Sequency-Ordered Fast Walsh Transforms," *IEEE Transactions on Computers*, vol. 26, No. 8, Aug., 1977, pp. 819-822.

Strobach, "Quadtree-Structured Recursive Plane Decomposition Coding of Images," *IEEE Transactions on Signal Processing*, vol. 39, No. 6, Jun., 1991 pp. 1380-1397.

Strobach, et al., "Space-Variant Regular Decomposition Quadtrees in Adaptive Interframe Coding," in Proc. ICASSP-88, paper M7.8, Apr., 1988, pp. 1096-1099.

(List continued on next page.)

*Primary Examiner*—Yon J. Couso
*Attorney, Agent, or Firm*—H. Donald Nelson; David T. Millers; Stephen R. Robinson

[57] ABSTRACT

Two dimensional data structures are represented by quadtree codes with embedded Walsh transform coefficients. The quadtree code permits both variable block size inherent in quadtrees, and the calculational simplicity of Walsh transform descriptions of nearly uniform blocks of data. Construction of the quadtree is calculationally simple for implementation in a digital system which does a bottom-up determination of the quadtree because Walsh transform coefficients and a measure of the distortion can be recursively calculated using only Walsh transform coefficients from the previous level in the quadtree. Uniform step size quantization, which is optimal for variable length coding and generalized gaussian distributions, permits fast encoding and decoding of quadtree code.

16 Claims, 5 Drawing Sheets

U.S. PATENT DOCUMENTS

| | | | |
|---|---|---|---|
| 5,241,395 | 8/1993 | Chen | 382/56 |
| 5,293,434 | 3/1994 | Feig | 382/56 |
| 5,295,203 | 3/1994 | Krause | 382/56 |

OTHER PUBLICATIONS

Strobach, "Image Coding Based on Quadtree-Structured Recursive Least-Squares Approximation," in Proc. Int. Conf., ASSP, May, 1989, pp. 1961–1964.

Strobach, "Tree-Structured Scene Adaptive Coder," IEEE Transactions on Communications, vol. 38, No. 4, Apr., 1990, pp. 477–486.

Samet, "The Quadtree and Related Hierarchical Data Structures," Computing Surveys, vol. 16, No. 2, Jun. 1984, pp. 187–260.

Vaisey, et al., "Variable Rate Image Coding Using Quad-Trees and Vector Quantization," Signal Processing IV: Theories and Applications, Elsevier Science Publishers B. V. Eurasip, 1988, pp. 1133–1136.

Vaisey, et al., "Variable Block-Size Image Coding," IEEE, ICASSP, 1987, pp. 1051–1054.

Ho, et al., "Variable-Rate Multi-Stage Vector Quantization for Image Coding," ICASSP, paper M9.1, IEEE 1988, pp. 1156–1159.

Dinstein, et al., "Variable Block-Size Transform Image Coder," IEEE Transactions on Communications, vol. 38, No. 11, Nov., 1990, pp. 2073–2078.

Boxerman, et al., "Variable Block-Sized Vector Quantization of Grayscale Images with Unconstrained Tiling," ICASIP, Paper M9.5, IEEE, 1990, pp. 2277–2280.

Pratt, et al., "Hadamard Transform Image Coding," Proceedings of the IEEE, vol. 57, No. 1, Jan., 1969, pp. 58–68.

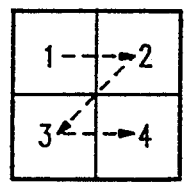
FIG. 5
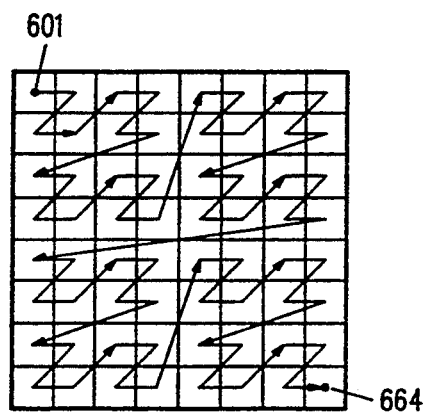
FIG. 6
| 0 | 0 | 1 | 2 | 2 | 2 | 2 | 2 |
|---|---|---|---|---|---|---|---|
| 0 | 0 | 1 | 1 | 2 | 2 | 2 | 2 |
| 0 | 1 | 1 | 2 | 2 | 2 | 2 | 2 |
| 1 | 1 | 1 | 1 | 2 | 2 | 2 | 2 |
| 1 | 1 | 1 | 2 | 2 | 2 | 3 | 3 |
| 2 | 2 | 1 | 1 | 3 | 3 | 3 | 3 |
| 3 | 3 | 2 | 1 | 2 | 3 | 3 | 3 |
| 3 | 3 | 2 | 3 | 3 | 3 | 3 | 3 |
UNIFORM PARTITION · INTERMEDIATE PARTITION · QUADTREE PARTITION
FIG. 7

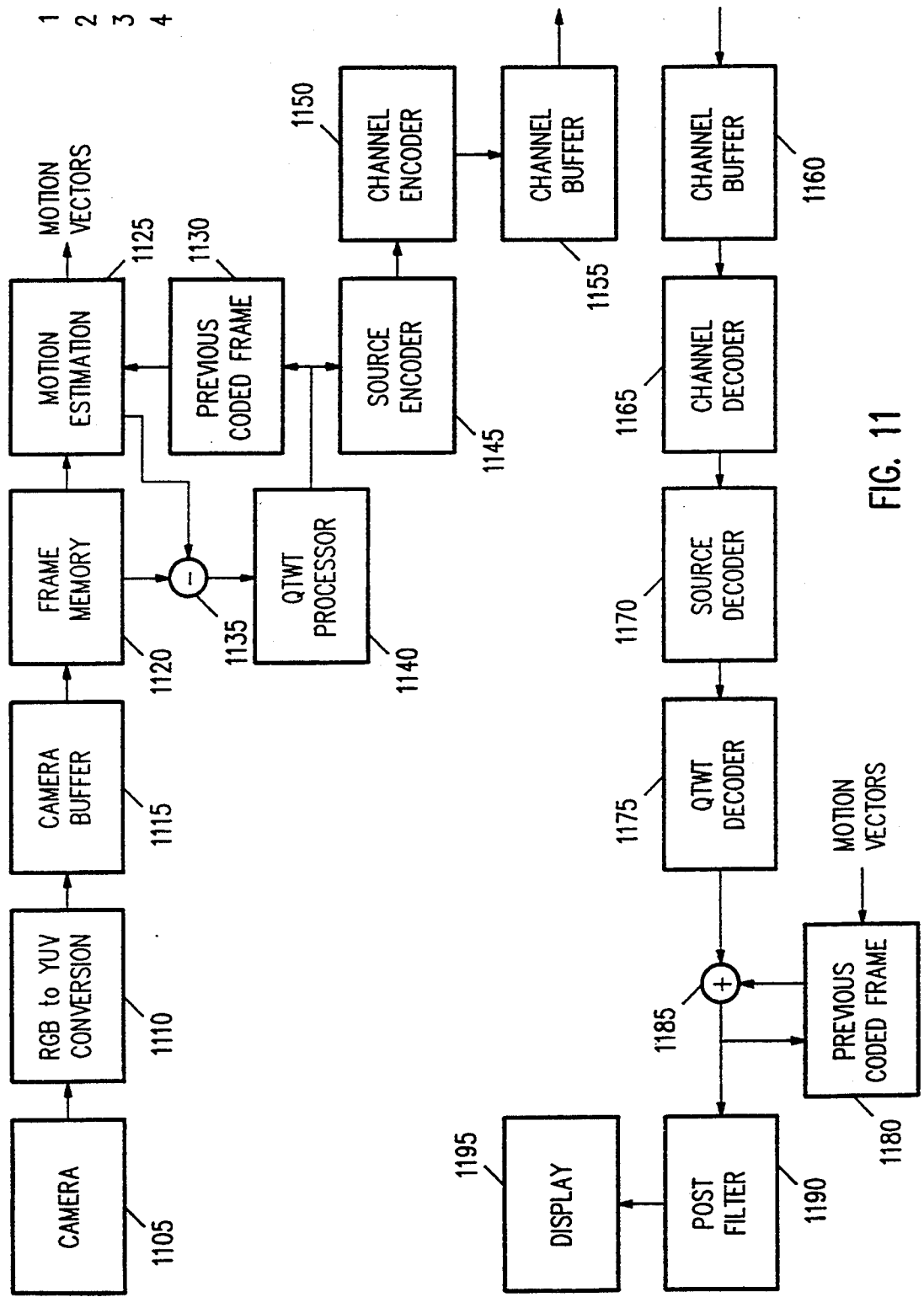

QUADTREE-STRUCTURED WALSH TRANSFORM VIDEO/IMAGE CODING

BACKGROUND OF THE INVENTION

1. Field of the Invention

This invention relates to methods and circuits for transmitting and storing information that is two dimensionally related and in particular relates to transmitting and storing digital information using a quadtree code with embedded Walsh transform coefficients.

2. Description of Related Art

Many two dimensional data structures are used in digital systems. A common example is a pixel map. Pixel maps are commonly used in video displays and in printers to describe a image being generated. With a pixel map, the color or intensity of each pixel is indicated by a corresponding datum in the pixel map. Pixel maps have rows and columns of data corresponding to the rows and columns of pixels on a video display and can include thousands or millions of data. For example, a standard VGA video display is 640 pixels wide and 480 pixels high and contains 307,200 pixels. A pixel map representing a two color image which fills a VGA display contains at least 307,200 bits of data, one bit for each pixel. For 256 colors or shades or grey, eight bits of data are required per pixel, and the pixel map contains at least 307,200 bytes. Because of the large number of pixels in a video image, pixel maps can require long times to transmit and large amounts of memory to store.

Encoding techniques exist for efficiently transmitting or storing two dimensional data structures without using pixel maps. One such technique uses quadtrees to describe images. A quadtree is a collection of nodes organized in levels and connected by branches. Each node in a quadtree structure has four branches connecting the node to four higher level nodes unless the node is a leaf node. Leaf nodes have no branches to higher levels.

For a two color image, each leaf node in the quadtree has a value which describes the color a particular area in the image. The level 0 node represents a block containing the entire image and is 1 if the image contains a foreground color and 0 if the image only contains a background color. A level 0 quadtree accurately represents only single color images. Nodes in higher levels of a quadtree correspond to sub-blocks of blocks described in preceding levels, and typically, more levels provide a more accurate quadtree representation of the image.

FIG. 1A shows a two color image having a foreground color region 100. FIG. 1B shows a quadtree which describes an approximation of the image of FIG. 1A. FIG. 1C shows blocks corresponding to the nodes of the quadtree of FIG. 1B. Level 1 of the quadtree corresponds to a partition which divides the image into four blocks 110, 120, 130, and 140. Block 120 contains only the background color and has node value zero. Blocks 110, 130, and 140 have node value one indicating at least a portion of blocks 110, 130, and 140 contains the foreground color. In FIG. 1B, level 1 nodes are 1011 using the convention that the top left block is the left-most branch, the top right block is the second branch from the left, bottom left block is the third, and bottom right block is the furthest right. A level 1 quadtree description of FIG. 1A replaces block 120 with the background color and each of blocks 110, 130, and 140 with the foreground color.

For level 2, blocks 110, 130, and 140 are divided into three sets of four sub-blocks 111–114, 131–134, and 141–144. Block 120 is not further divided because the level 1 description of block 120 accurately represents the constant background color of block 120. At level 2, blocks 113, 114, 131, 132, and 141 contain the foreground color and have node value one. Blocks 111, 112, 133, 134, and 142–144 contain only the background color and have node value zero.

The quadtree of FIG. 1B is expanded to level 2 by adding four new nodes and four new branches to each non-zero node of level 1. The level 2 quadtree of FIG. 1B approximates the image by filing blocks 113, 114, 131, 132, and 141 with the foreground color and filing blocks 111, 112, 120, 133, 134, and 142–144 with the background color. The level 2 quadtree is more accurate than either level 0 or 1 because smaller blocks are represented.

Each block 113, 114, 131, 132, and 141 which contain the foreground color, is partitioned into four sub-blocks to generate level 3. Higher levels are determined by recursive partitioning of blocks which contain the foreground color until the smallest blocks contain a single pixel.

A quadtree code is generated from a quadtree by ordering node values from the quadtree according to a predefined format. One format orders node values as read from left to right and from the top down. For the quadtree of FIG. 1B, a quadtree code is 1|1011|001111001000. (The symbol | is shown to separate quadtree code into levels for the reader's convenience and is not part of the quadtree code.) Quadtree codes often require less memory to store than do pixel maps and can be transmitted faster than a pixel map.

One disadvantage of the described quadtree code is that each block is restricted to a single color. A method that permits an efficient description of variation in of data values over the area of each block would be desirable.

SUMMARY OF THE INVENTION

In accordance with an embodiment of the present invention, a method is provided for generating quadtree codes with embedded Walsh transform coefficients. The method uses a bottom-up recursive process for pruning a quadtree and typically starts by partitioning a two dimensional data structure into a level N uniform partition which has $4^N$ blocks corresponding to the leaf nodes of a balanced quadtree. Each block in the level N partition comprises a matrix of pixel values. The matrices of pixel values are Walsh transformed, and a preselected subset of the Walsh transform coefficients are kept to approximate each block. The kept Walsh transform coefficients are referred to as a Walsh transform description.

A level N-1 uniform partition of the two dimensional data structure contains $4^{N-1}$ disjoint blocks, each block being the union of four blocks from the level N partition. From the kept Walsh transform coefficients for the level N blocks, Walsh transform coefficients for blocks in the level N-1 uniform partition are calculated. Also calculated is a measure of the distortion per block caused by replacing. Walsh transform description of four blocks in the level N partition with a Walsh transform description of one block in level N-1 partition. When the measure of the distortion is less than a predefined threshold $T_m$, nodes corresponding to the four level N blocks are pruned from the quadtree, so that a node corresponding to the union of the four blocks is made a leaf node. Only a preselected subset of the Walsh transform coefficients for the leaf nodes are kept. The pruning of the quadtree continues recursively through all the quadtree's levels.

A quadtree code constructed from the pruned quadtree contains, in a predefined order, values for every node in the pruned quadtree, each value indicating whether a corresponding node is a leaf node. The kept Walsh transform coefficients are embedded into the quadtree code following corresponding leaf nodes. Often the Walsh transform coefficients are quantized using uniform step size and then variable length coded for transmission.

In accordance with another embodiment of the invention, the values in a quadtree code follow a walking-the-tree order, wherein the node values follow an order defined by a succession of branches, each branch ending with a leaf node. In the quadtree code, after the value representing a leaf node, information such as Walsh transform coefficient is embedded to describe the data in the block corresponding to the leaf node. The walking-the-tree order permits the beginning of coding and transmission of a quadtree code to be before the entire quadtree is known and permits decoding of the quadtree code when the first branch is complete.

Another embodiment of the present invention comprises a video/image coder which converts a pixel map representing a still, image or difference image into a quadtree code with embedded Walsh transform coefficients. Still another embodiment in accordance with the present invention is a decoder which converts a quadtree code with embedded Walsh transform coefficients into a pixel map.

BRIEF DESCRIPTION OF THE DRAWINGS

FIGS. 5 and 6 show the priority of branches and blocks during a bottom-up testing and pruning of a quadtree.

FIG. 7 shows a representation of a four color image which is pruned to determine a quadtree.

FIG. 11 shows a block diagram of a video/image coded in accordance with an embodiment of the present invention.

FIG. 12 shows an order for transmission of a four by four matrix of Walsh transform coefficients.

Similar or identical items in different figures have the same reference numerals or characters.

DETAILED DESCRIPTION OF THE PREFERRED EMBODIMENTS

Figure 2:
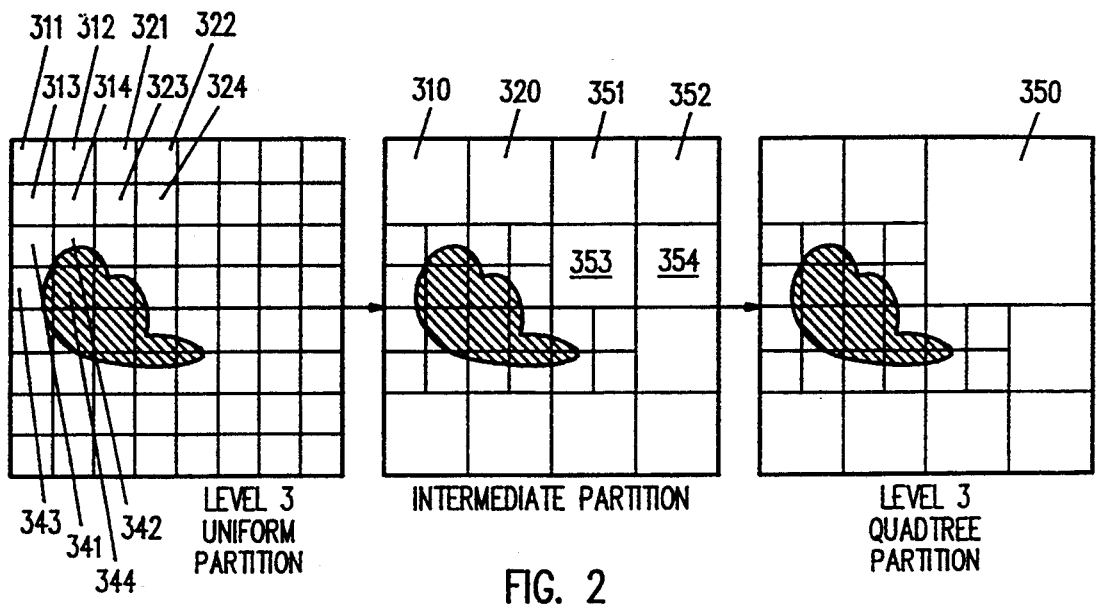
FIG. 2 shows a partition corresponding to leaf nodes of a balanced quadtree and partitions which correspond to a quadtree after two levels of pruning.

Quadtrees can be constructed from the bottom up starting with a balanced quadtree structure that has leaf nodes corresponding to a level N uniform partition which divides a two dimensional data structure into $4^N$ blocks of data. Nodes can be removed (or pruned) from the quadtree by testing and merging sets of four blocks. In FIG. 2, a level 3 uniform partition divides a two color video image into sixty four ($4^3$) blocks of pixels. For simplicity, the blocks in FIG. 2 are all the same size. However, unequal blocks can be used, if blocks represented by a quadtree code can be identified.

Generally, the choice of initial partition determines the accuracy of the quadtree representation of a two color image. When each block holds only a single pixel the quadtree representation provides an exact representation of the image. If more than one pixel is in the initial blocks of the partition then the quadtree representation ismexact only for special images such as two color images where every block of the initial partition of the image contains only a single color.

Blocks 311–314 in the initial uniform partition can be tested to determine if blocks 311–314 should be merged into a single block 310. For a two color image, a test can determine if any of the blocks 311–314 contains the foreground color. If any do, the blocks are not merged. If none do, the blocks are merged, and the four nodes which correspond to the blocks are pruned from the quadtree. For grey scale or multicolor images, one type of test determines whether four adjacent blocks have the same color or intensity, and if the blocks all do, the blocks are merge into a larger block having a single uniform color or intensity. Other tests for merging are disclosed below.

When four blocks are merged, they form a block which is part of a coarser uniform partition that corresponds to a lower level of the quadtree. Accordingly, each level of the quadtree has a corresponding uniform partition from a series of uniform partitions. A rule or look-up table which identifies the blocks in the uniform partitions is necessary for decoding a two dimensional data structure from a quadtree code. For example, when a quadtree code indicates that a block has a uniform color, the size and location of the block must be known before the quadtree code can be decoded.

Figure 3:
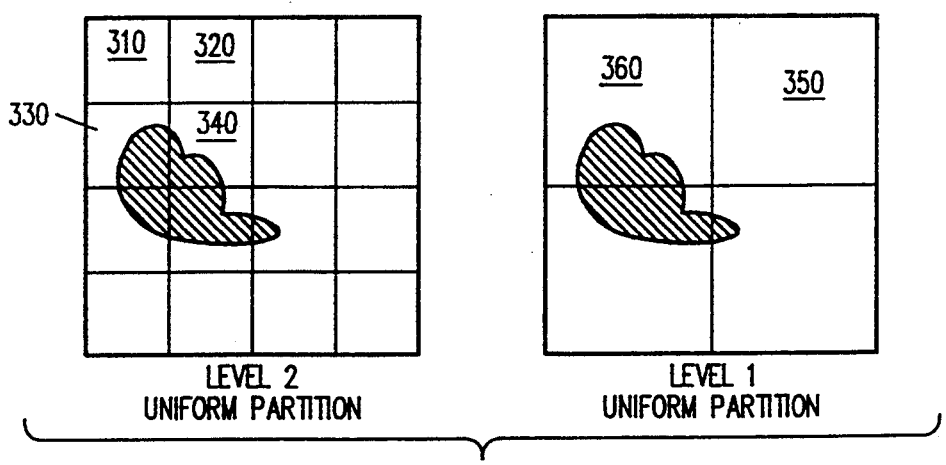
FIG. 3 shows level 1 and level 2 uniform partitions of the image of FIG. 1A.

One of the simplest series of uniform partitions corresponding to the levels of a quadtree is formed by repeated equal quartering of the image. The level 3 uniform partition of FIG. 2 and level 1 and 2 uniform partitions of FIG. 3 illustrate a series of uniform partitions formed by equal quartering. Using equal quartering, an image which is 512-by-512 pixels and has a level 0 uniform partition that is one 512-by-512 pixel block, a level 1 uniform partition that is four 256-by-256 pixel blocks, a level 2 uniform partition that is sixteen 128-by-128 pixel blocks, and so on to a level 9 uniform partition which is 262,144 blocks each containing a single pixel.

In a bottom up construction of a quadtree, pruning the initial balanced quadtree creates a quadtree with leaf nodes corresponding to an intermediate partition. Blocks in the intermediate partition are then tested and merged if the blocks meet the appropriate conditions. In FIG. 2, blocks 351–354 contain only the background color and are merged to form block 350 which is one of the blocks in the level 1 uniform partition. Blocks 310 and 320 cannot be merged because neither block 330 nor-block 340 is in the intermediate partition. Generally mergers and pruning of the quadtree continue recursively through one or more intermediate partitions until no further mergers are possible. At that point, the quadtree partition obtained contains only the blocks which correspond to leaf nodes of the pruned quadtree.

A quadtree code can be determined by providing a binary value for each node in the pruned quadtree, for example a zero for leaf nodes and a ones otherwise, then ordering the binary values in a predefined order. For example, as described above, all the values for level 0 of the pruned quadtree, then level 1, then-level 2, and so on to the highest level of the quadtree.

In accordance with the present invention, another ordering of the values, referred to as walking-the-tree order, can be used. According to the walking-the-tree order, the quadtree code starts with a lowest level value, typically level 0 value, and proceeds down a branch until a leaf node is reached. The order then returns up the branch to the highest node which has one or more branches that have not been described, then follows the nodes down a not yet described branch until a next leaf node is reach. The order of values continues in this fashion branch by branch until all the values in the quadtree are given.

Figure 1A:
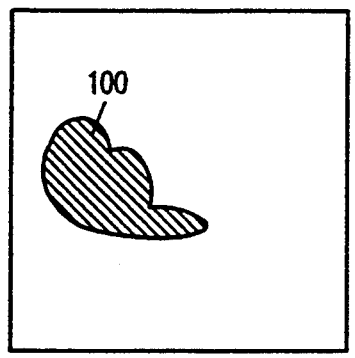
FIG. 1A shows a two color image that can be represented by a pixel map.
Figure 1B:
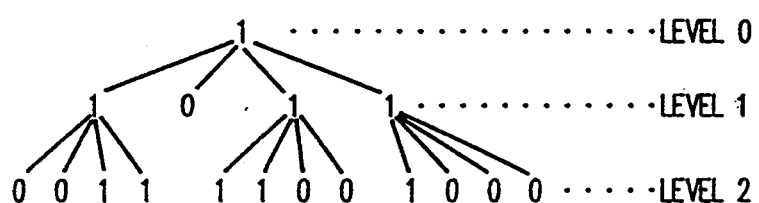
FIG. 1B shows a level 2 quadtree representing the image of FIG. 1A.
Figure 1C:
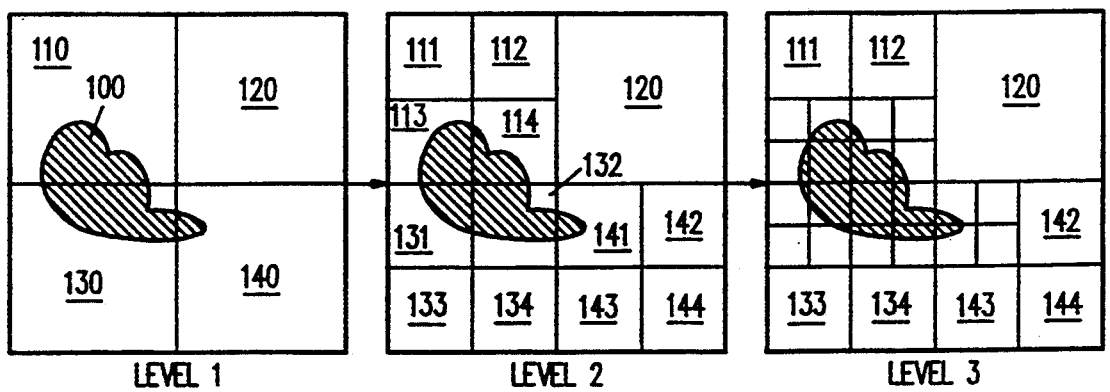
FIG. 1C shows blocks corresponding to leaf nodes of level 1, level 2, and level 3 quadtrees representing the image of FIG. 1A.
Figure 4:
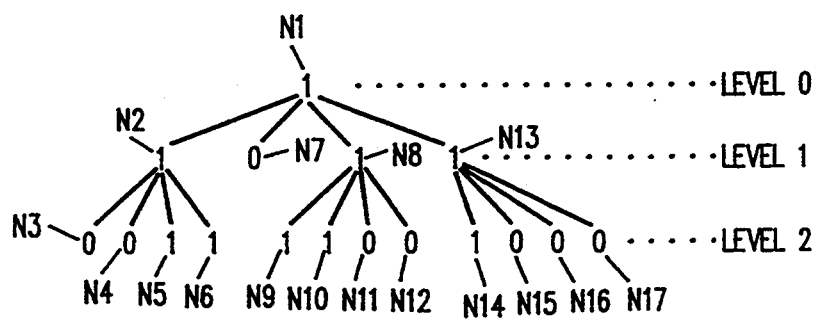
FIG. 4 shows a walking-the-tree order for the nodes of a quadtree code corresponding to the image of FIG. 1A.

FIG. 4 shows the quadtree of in FIG. 1B and illustrates one example of a walking-the-tree order. The walking-the-tree order illustrated in FIG. 4 describes node values on each branch in order from lower level to higher level until a leaf node is reached. The branches are selected according to a predefined priority for each node. When a node has multiple branches which have not been described, the branch to a higher priority node is followed. The priority for the nodes is given by the location of the corresponding block as indicated in FIG. 5. The node corresponding to the top-left block has highest priority, the top-right block is second, the bottom-left block is third, and the bottom-right block has lowest priority. Once a leaf node is reached, the branch is traced back down to the highest level node which has a branch containing node values not given, then the highest priority branch having values not given is followed. Branch after branch is followed in this manner until all of the node values in the quadtree are given by the quadtree code.

Using the above disclosed conventions, the first branch in FIG. 4 runs from node N1 to node N2 to leaf node N3. Node N2, the next highest node, has three branches with node values not given. The three branches from N2 contain only leaf nodes N4, N5, and N6 which are given in that order. After the last branch from N2 is completed, the next branch is from node N1 and contains only the leaf node N7. The following branch is also from node N1 and contains node N8 and N9, then the three branches from N8, each containing only node N10, N11, or N12. The-walking-the-tree order continues in the same manner until all the branches of the quadtree are described giving the quadtree code 11001101110011000.

With a walking-the-tree order, initial values of a quadtree code can be transmitted as soon as the first branch is known, and bottom-up determination of a quadtree can proceed branch by branch. Transmission of a quadtree code need not be delayed while the entire quadtree is determined. For example, in the level 2 uniform partition of FIG. 3, block 310 corresponds to node N3, block 360 corresponds to node N2, and the entire image corresponds to node N1. Testing blocks 341, 342, 343, and 344 (FIG. 2) indicates that blocks 341, 342, 343, and 344 cannot be merged. Therefore, blocks 310, 320, 330, and 340 can not be merged, and nodes N1 and N2 have value one. Since block 310 is uniformly the background color, N3 is zero, the first branch of the quadtree is known, and the branch N1-N2-N3 can be transmitted without determining any other nodes or any complete levels.

Prior art quadtree codes describe a complete lower level before describing any values in the next higher level, so with a bottom-up determination of the quadtree, the entire quadtree must be determined before the initial values of the prior art quadtree code are provided. Accordingly, transmission of a quadtree code according to the prior art order must be delayed until the entire quadtree is determined.

FIG. 6 shows the order in which blocks of a level 3 uniform partition should be tested to determine node values on branches in the sequence defined by walking-the-tree order disclosed above. The order of FIG. 6 permits transmission of a quadtree code while determining the remainder of the quadtree. Many other walking-the-tree orders could be employed which would change the sequence of the branches quadtree code and the order in which blocks are tested.

The quadtree code described above does not provide color or intensity information for multicolor or grayscale images. Ones and zeros from the quadtree code indicate only the quadtree structure. In accordance with the present invention, color or intensity information can be embedded into the quadtree code.

FIG. 7 shows a level 3 uniform partition of a four color image where a number in each block indicates the color of the block. To generate a quadtree, a set of four blocks corresponding to level 3 nodes can be tested to determine whether all four blocks have the same color. If the four blocks have the same color, the blocks are merged and the corresponding nodes are pruned from the quadtree leaving the node corresponding to the union of the four blocks as a level 2 leaf node. The merger of the blocks in the uniform partition forms an intermediate partition, also shown in FIG. 7, which represents the leaf nodes of a partly pruned quadtree. In the intermediate partition, blocks corresponding to level 2 leaf nodes are tested for possible further merger and pruning. After the level 2 leaf nodes are pruned, the level 1 leaf nodes are tested, but for the example image shown in FIG. 7 no merger of level 1 nodes is possible.

Instead of testing in complete levels, the color image can also be pruned according to a walking-the-tree order as described above. Either pruning method provides a quadtree partition representing the leaf nodes of a quadtree representation of the image.

A quadtree code for the color image can be formed by embedding in the code color information following every leaf node. For example, a conventional quadtree code for the quadtree partition of FIG. 7 is 1|1011|011110011010 where the branch convention shown in FIG. 5 is used. Color information can be provided immediately after every zero value leaf node and following the highest level leaf nodes having node value one. According to this convention, a quadtree code describing the image in FIG. 7 is 1|10(2)11|0(0)1(1211)1(0111)1(1211)1(1122)0(1)0(3)1 (2123)1(2213)0(3)1(2333)0(3) where the parentheses and the symbols | are not part of the quadtree code but are added for the reader's convenience to separate color information and levels respectively. This quadtree code requires 85 bits, 34 two-bit numbers for color information and 17 bits for quadtree structure. An uncompressed pixel map would require 128 bits, two bits for each block. Color or intensity information can also be embedded into the quadtree code at the end of each level for example 1|1011(2)011110011010(1333)|(12110111121111222212-32213233 3). Other embedding conventions are possible and are not limited to four color images but can be used with any multicolored or grayscale image.

Embedding the color information in the quadtree code has advantages over providing a quadtree code separate from color information, for example following the quadtree code with all color information. For quadtree codes that follow a walking-the-tree order such as disclosed above, embedded color information in the quadtree code after each 20 leaf node allows immediate construction of a block of the image before the complete quadtree code is known.

Instead of embedding a single number for each leaf node to indicate a color or grayscale intensity for the block corresponding to the node, several coefficients can be embedded into the quadtree code to describe variation of pixel values over the corresponding block. For example, coefficients for a polynomial or other function which describes the variation of color or intensity over the area of a block can be embedded to the quadtree code. 30 In one embodiment of the invention, one or more Walsh transform coefficients, as defined below, describe the color or intensity of a block.

For simplicity, the following embodiments deal with grayscale images which have a pixel map describing a two-dimensional grid of pixels where the intensity of each pixel is described by a single number in the pixel map. Generalizing to other two dimensional data structures such as pixel maps which use three numbers to indicate color components will be apparent from the embodiments disclosed.

A pixel map of a grayscale image has rows and columns of intensity values and can be manipulated as a matrix using well known linear algebra and matrix notation. Similarly, when a pixel map is partitioned into blocks, each block can be manipulated as a matrix. In accordance with the present invention, a quadtree is chosen with leaf nodes that correspond to different size blocks, but the same predetermined number of Walsh transform coefficients describes each block regardless of the size of the block. The number of pixels in each block which corresponds to a leaf node is restricted by the requirement that the predetermined number of Walsh transform coefficients provide a sufficiently accurate approximation of pixel variation over the block.

Figures 8, 9, 10:
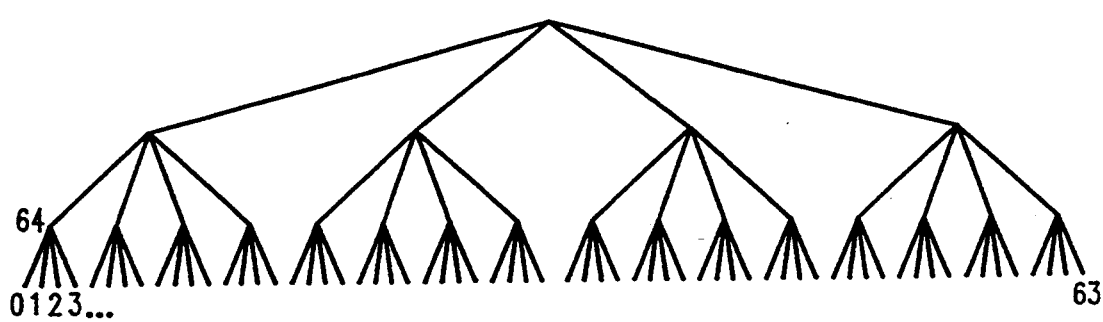
FIG. 8 shows two by two, four by four, and eight by eight Walsh transformation matrices.
FIG. 9 shows a factorization of an eight by eight Walsh transformation matrix into three sparse matrices.
FIG. 10 shows a level 3 balanced quadtree structure.

Discrete Walsh transformations can be performed using matrix multiplication and N-by-N transformation matrices as shown in FIG. 8 for N equal to 2, 4, and 8. In FIG. 8, the symbol "−" stands for −1. Every value in a Walsh transformation matrix is either 1 or −1. Accordingly multiplication by a Walsh transformation matrix is performed by addition (or subtraction) of components. No multiplication (other than multiplication by one) is required. Accordingly, Walsh transformations can be calculated quickly by digital systems.

For any N by M matrix x where N and M equal $2^i$ and $2^j$ respectively for any positive integers i and j, the Walsh transform x of the matrix x is defined to be $^N W \cdot x \cdot ^M W$ where $^N W$ and $^M W$ are respectively N-by-N and M-by-M Walsh transformation matrices. The components of the Walsh transformed matrix X are referred to as Walsh transform coefficients. Since the matrix product of Walsh transformation matrices $^N W \cdot ^N W$ equals N·I where I is the identity matrix, x equals $(^N W \cdot X \cdot ^M W)/(N \cdot M)$ N-by-N Walsh transformation matrices can be factored into sparse matrices $^N A_1, \ldots, ^N A_Z$ where $Z = \log_2 N$. The factorization of the 8 by 8 Walsh transformation matrix into three sparse matrices $^8 A_3 \cdot ^8 A_2 \cdot ^8 A_1$ is shown in FIG. 9. It can be shown that for any 2N by 2N Walsh transformation matrix that $$^{2N}W = {}^{2N}A_{Z+1} \cdot \begin{vmatrix} ^N A_Z & 0 \\ 0 & ^N A_Z \end{vmatrix} \cdot \ldots \cdot \begin{vmatrix} ^N A_1 & 0 \\ 0 & ^N A_1 \end{vmatrix}.$$

It can also be shown that $^{2N}A_{z+1}$ equals $\delta_{1/2 1)j} + (-1)^{(i/2)} \delta_{(N+1/2 1)j}$ for even i and equals $\delta_{(1/2 i + 1/2)j} + (-1)^{1/2(i-1)} \delta_{(N+1/2 i + 1/2)j}$ for odd i, where i and j are row and column indexes respectively and take values between 1 and 2N, and $\delta_{ab}$ is a kronecker delta which is 1 if a equals b and 0 otherwise.

The Walsh transformation matrices shown in FIG. 8 are referred to as being in sequency order meaning that each row (or column) starting from the top (or left) has one more change in sign than does the preceding row (or column). With sequency order, a Walsh transform of a uniform matrix, i.e. a matrix where all the components are equal, has one non-zero Walsh transform coefficient, the top left coefficient. For a nearly uniform matrix, only the Walsh transform coefficients near the top left of the transformed matrix are significant. Accordingly, a subset of Walsh transform coefficients are sufficient to provide a good approximation of a uniform or nearly uniform matrix.

A balanced quadtree that exactly describes an image can be constructed for any square image having height and width equal to $2^i$ pixels for some positive integer i. Other size images can be constructed from a collection of such square images. FIG. 10 shows a balanced quadtree having 64 leaf nodes. If each leaf node corresponds to a block containing a single pixel, the quadtree of FIG. 10 combined with intensity information or a single Walsh transform coefficient exactly describes the image. If each block in the level 3 of FIG. 10 is a two-by-two matrix, four Walsh transform coefficients per leaf node are sufficient to guarantee an exact representation of the image, because the Walsh transform of two-by-two block only has four coefficients. Similarly, if a level 3 partition has $N_t$ by $N_t$ pixels per-blocks $N_t^2$ Walsh transform coefficient guarantee an exact representation.

In accordance with one embodiment of the present invention, an exact quadtree is pruned to generate leaf nodes corresponding to blocks that are approximately uniform so that the top-left Walsh transform coefficients describe the block to a desired accuracy. As the quadtree is pruned, any Walsh transform coefficients not needed to describe a block are dropped. Walsh transform coefficients are determined recursively.

The recursive relation of the Walsh transform coefficients can be expressed in matrix notation as follows. Four N-by-N matrices $x_1$, $x_2$, $x_3$, and $x_4$ can be merged into a 2N-by-2N matrix x where $$x = \begin{vmatrix} x_1 & x_2 \\ x_3 & x_4 \end{vmatrix}.$$

The Walsh transforms of matrices $x_1$, $x_2$, $x_3$, $x_4$, and x are matrices $x_1$, $x_2$, $x_3$, $x_4$, and X respectively. Only the top-left $N_t^2$ Walsh transform coefficients are kept during pruning, so that the Walsh transformation matrices $x_1$, $x_2$, $x_3$, $x_4$, and x are approximated by matrices $x'_1$, $x'_2$, $x'_3$, $x'_4$, and x' which have the form $$X' = \begin{vmatrix} a & 0 \\ 0 & 0 \end{vmatrix}$$

where a is a $N_t$ by $N_t$ matrix and 0 represents appropriately sized matrices with all components equal to zero. It can be shown that $$X = {}^{2N}\!A_{Z+1} \cdot \begin{vmatrix} X_1 & X_2 \\ X_3 & X_4 \end{vmatrix} \cdot {}^{2N}\!A_{Z+1}^T,$$

where ${}^{2N}\!A_{Z+1}$ is the sparse matrix described above and ${}^{2N}\!A_{Z+1}T$ is the transpose of matrix ${}^{2N}\!A_{Z+1}$. From the form of matrix ${}^{2N}\!A_{Z+1}$, it can be shown that only the top-left coefficients of the matrices $x_1$, $x_2$, $x_3$, and $x_4$, i.e. only $x'_1$, $x'_2$, $x'_3$, $x'_4$, are required to determine x', the top-left $N_t^2$ coefficients of x. Accordingly, after each pruning of the quadtree (or merger of blocks), the Walsh transform coefficients of a new leaf node block can be calculated using only the kept Walsh transform coefficients. There is no need to calculate from the pixel level or to temporarily store more than the $N_t^2$ Walsh transform coefficient values which are kept to describe the higher level blocks.

Each time the quadtree is pruned, four blocks $x_1$, $x_2$, $x_3$, and $x_4$ are merged into one block x, and if every block $x_1$, $x_2$, $x_3$, $x_4$, and x is described by the same number $N_t^2$ of Walsh transform coefficients, the total number of coefficients describing the image is decreased by 3 times $N_t^2$. Typically, this increases distortion of a reconstructed image.

One measure of the distortion is the square-error which provides a distortion per block. The square-error compares the original image with an image reconstructed from the quadtree code From the top-left $N_t^2$ Walsh transform coefficients kept in the quadtree code, a decoded image has four pixel matrices $x'_1$, $x'_2$, $x'_3$, and $x'_4$ or, if the four are merged, one pixel matrix x'. The pixel matrices $x'_1$, $x'_2$, $x'_3$, $x'_4$, and x' are inverse Walsh transformations of matrices $x'_1$, $x'_2$, $x'_3$, $x'_4$, and x' described above.

The square-error distortion caused by describing the block x with $N_t$ Walsh transform coefficients is $\|x-x'\|$, the sum of the squares of all components of the matrix $x-x'$. It can be shown using standard linear algebra that $\|x-x'\|$ equals $\|x_1-x'_1\| + \|x_2-x'_2\| + \|x_3-x'_3\| + \|x_4-x'_4\| + \mathrm{tr}BB^T/(2N)^2$, where for $Z = \log_2 N$ $$B = {}^{2N}\!A_{Z+1} \cdot \begin{vmatrix} X_1 & X_2 \\ X_3 & X_4 \end{vmatrix} \cdot {}^{2N}\!A_{Z+1}^T - X.$$

The square-error resulting from using the block x as a leaf node is the sum of by the square-error caused of blocks $x'_1$, $x'_2$, $x'_3$, and $x'_4$ plus an additional error caused by merging. Because matrix B is completely determined by the Walsh transform coefficients in blocks $x'_1$, $x'_2$, $x'_3$, and $x'_4$, the additional square-error can be determined recursively from the saved Walsh transform coefficients, and there is no need to return to a pixel level calculation or to save extra Walsh transform coefficient values for calculation of the additional square-error.

Another measure of the additional distortion is the sum of the absolute values of the matrix B which is requires fewer multiplications to calculate because the components of B do not need to be squared. Still another measure of the additional distortion is the maximum of the absolute values of coefficients in the matrix B. Determining which measure is the best for images is subjective because for images the goal is to have decoded images which are the least changed from the original according to a human view. Both the sum and the maximum absolute value of the coefficients in B have been experimentally found to provide a decoded image which appears close to the original.

Pruning of a quadtree can be done recursively by merging only the sets of four blocks which cause the smallest additional error. A pruning threshold $T_m$ can be set such that if the additional error caused by pruning is less than the pruning threshold then nodes are pruned. The value of the pruning threshold $T_m$ and the type of measure for the error determine the accuracy of the quadtree description. For the square-error, the additional error is the trace of $BB^T/(2N)^2$. For absolute sum error, the additional error is the sum of the absolute values of the coefficients of B divided by $(2N)^2$. For absolute maximum error, the additional error is the maximum absolute value of the coefficients of B and can be determined without division.

Typically, Walsh transform coefficients are determined to more significant bits than are embedded in a quadtree code, and the Walsh transform coefficients are quantized to a desired number of possible values. The quantization causes distortion because the quantized values only approximate the correct coefficient values. As is well known in the art, for a fixed bit rate transmission, the optimal quantization technique for minimizing distortion caused by quantization depends on the distribution of values to be quantized and on the method of coding quantized values.

For a generalized gaussian distribution and variable length coding of the Walsh transform coefficients, quantization with uniform step size minimizes the distortion for a fixed bit rate transfer. Uniform step size divides the Walsh transform coefficients by a fixed quantization step size q, and then rounds the result to the nearest integer. A different step size q can be chosen for each coefficient so that the largest anticipated Walsh transform coefficient falls within the desired range of values. As disclosed below, for a particular embodiment of the invention, the same quantization step size can be used for all coefficients in a block.

Different step sizes $q_N$ can be used for different size blocks. Typically, Walsh transform coefficient magnitudes are proportional to $N^2$ where N-by-N is the block size. Step sizes $q_N$ equal to $q_0 \cdot N^2$ compensate for the increased in coefficient size for larger blocks. Quantization can be improved by taking into account that error caused by quantization of the coefficients of a large block disturbs more pixels than quantization of a small block. An estimated quantization error, assuming uniform distribution, is proportional to $N^2 \cdot q^2$. Accordingly, a better quantization method uses step size $q_N$ equal to $q_0 \cdot N$ for blocks of size N.

A further restriction of the step size is that the resultant quantization distortion should maintain the image accuracy of the pruning threshold $T_m$. Accordingly, the number of possible values after quantization should be minimized to reduce the number of bits required to express the quantized values, but enough possible values should be provided so that the distortion caused by quantization does not outweigh the distortion caused by pruning. Tables 1 and 2 show values for the pruning threshold $T_m$ and quantization constant q which provide compatible amounts of distortion. $T_m$ is a limit for the square-error $(trBB^T/(2N)^2)$ divided by four, and the step size of the quantized coefficients is $2 \cdot N \cdot q$.

pares the frame in frame memory 1120 image to previous frame stored in a frame buffer 1130 and determines an average offset of information between frames and generates motion vectors which are transmitted to a decoder. A shifted previous frame is then subtracted 1135 from the frame in frame memory 1120 to provide a difference image.

Motion estimator 1125 and subtraction 1135 are not necessary for still images such as found in an image archive system. Accordingly, a still image coded can be made by eliminating motion estimator 1125 and subtraction 1135, so that a still image instead of on a difference frame is coded.

A quadtree Walsh transform (QTWT) processor 1140 creates a quadtree code and quantizes the Walsh transform coefficients for the difference frame using the methods disclosed above. Such processors may be implemented in hardware or in software (as in the Appen-

TABLE 1

| $T_m$ | 16 | 25 | 25 | 36 | 64 | 81 | 196 | 196 | 225 | 289 | 361 | 441 | 729 | 784 | 841 | 900 | 961 | 1024 | 1089 |
|---|---|---|---|---|---|---|---|---|---|---|---|---|---|---|---|---|---|---|---|
| q | 8 | 16 | 16 | 16 | 16 | 32 | 32 | 32 | 32 | 32 | 32 | 32 | 64 | 64 | 64 | 64 | 64 | 64 | 64 |

TABLE 2

| $T_m$ | 9 | 16 | 25 | 36 | 64 | 64 | 100 | 121 | 144 | 169 | 196 | 225 | 256 | 400 | 484 | 529 | 625 | 729 | 784 | 784 |
|---|---|---|---|---|---|---|---|---|---|---|---|---|---|---|---|---|---|---|---|---|
| q | 8 | 8 | 8 | 8 | 8 | 16 | 16 | 16 | 16 | 16 | 16 | 16 | 16 | 32 | 32 | 32 | 32 | 32 | 32 | 64 |

After the coefficients are quantized, they are variable length coded. Variable length coding such as Huffman coding requires fewer bits for the most frequent values and more bits for the least frequent values so that the average size of the quadtree code is reduced by variable length coding.

A decoder which receives the quadtree code typically uses a look-up table to decode the Huffman coding and then multiplies quantized Walsh transform coefficients by the step size $q_N$ to restore approximate Walsh transform coefficients. The decoder determines the block size and the appropriate step size $q_N$ from the quadtree structure.

FIG. 11 shows a block diagram including a video/image coded in accordance with an embodiment of the invention. The video/image coded may be used, for example, in applications such as a video telephone communications or an image archive system for storing compressed images. As shown in FIG. 11, the coder side of the coded connects to a camera 1105 or some other source which provides video signals that represent a series of images or frames which create the appearance of a moving image. Any known or yet to be developed video format for video signals may be used, and can be converted from one format to another by a converter 1110 if desired.

Most current video signal formats provide each frame as a series of horizontal lines which can be captured in a camera buffer 1115 to created a two dimensional data structure such as a pixel map for a frame. A frame memory 1120 receives a pixel map for the frame from camera buffer 1115. Typically, two consecutive frames in a moving image are closely related to each other. By comparing two consecutive frames, the amount of information in the second frame can be reduced by subtracting the information already transmitted with a previous frame.

Many techniques are known for reducing the amount of information per frame of a series of frames. In the embodiment of FIG. 11, a motion estimator 1125 comdix.) In one embodiment, processor 1140 breaks the difference frame in the a series of square subimages such as series of 16 by 16 pixel sub-images and provides a quadtree code for each separate sub-image. Processor 1140 also quantizes the Walsh transform coefficients. It has been experimentally determined that difference. frames for a wide variety of moving images have Walsh transform coefficients that, with the exception of the top-left (or DC) coefficient, have values that approximately follow a Lapacian distribution where the probability of a coefficient having a value x is approximately proportional to $\exp\{-|x|\}$. In the embodiment where a frame is divided into sub-images, the difference between the DC coefficient for neighboring subimages is also approximately Lapacian.

A bit rate distortion function can be used to determine bit rates and step sizes for every Walsh transform coefficient in an N-by-N block. Experiments show that step size assignments which minimize the quantization distortion subject to the constraint of a constant bit rate are nearly uniform for every kept coefficient in an N-by-N block, even though the absolute magnitudes of coefficients vary.

The quadtree codes are combined with the previous frame in buffer 1130 for internal use and transmitted through a source encoder 1145, a channel encoder 1150, and a channel buffer 1155 to a channel. Decoding the quadtree code and combining the. decoded difference image to the previous frame in buffer 1130 provides a decoded frame which is the same as the frame generated by a decoder.

Source encoder 1145 variable length codes the Walsh transform coefficients in quadtree code. In accordance with one embodiment of the present invention, after quantization according to block size, the Walsh transform coefficients for a difference image range from −255 to 255, (511 possible values) with the most likely value being 0. To create Huffman codes for this embodiments, the possible values can be divided into eight classes $C_0$-$C_8$ as shown in Table 3.

| CLASS | VALUES IN CLASS | BINARY REPRESENTATION | |
|---|---|---|---|
| $C_0$ | 0 | 0 | (24) |
| $C_1$ | ±1 | 1 | |
| $C_2$ | ±2, ±3 | 1* | |
| $C_3$ | ±4, ±5, ±6, ±7 | 1** | |
| $C_4$ | ±8, ±9, ..., ±15 | 1*** | |
| $C_5$ | ±16, ±17, ..., ±31 | 1**** | |
| $C_6$ | ±32, ±33, ..., ±63 | 1**** | |
| $C_7$ | ±64, ±65, ..., ±127 | 1***** | |
| $C_8$ | ±128, ±129, ..., ±255 | 1****** | |

The Huffman codes used for each class depend on the number of Walsh transform coefficients which describe each block. The Huffman codes for classes $C_0$-$C_8$ shown in Tables 4, 5, and 6 are for one, four, and sixteen Walsh transform coefficients per block respectively.

TABLE 4

| CLASS | CODE | |
|---|---|---|
| $C_0$ | 1 | (25) |
| $C_1$ | 00 | |
| $C_2$ | 011 | |
| $C_3$ | 0101 | |
| $C_4$ | 01000 | |
| $C_5$ | 010010 | |
| $C_6$ | 0100110 | |
| $C_7$ | 01001110 | |
| $C_8$ | 01001111 | |

TABLE 5

| CLASS | CODE | |
|---|---|---|
| $C_0$ | 01000 | (26) |
| $C_1$ | 00 | |
| $C_2$ | 011 | |
| $C_3$ | 0101 | |
| $C_4$ | 010010 | |
| $C_5$ | 0100110 | |
| $C_6$ | 01001110 | |
| $C_7$ | 010011110 | |
| $C_8$ | 010011111 | |
| EOB | 1 | |

TABLE 6

| CLASS | CODE | |
|---|---|---|
| $C_0$ | 0010 | (27) |
| $C_1$ | 1 | |
| $C_2$ | 010 | |
| $C_3$ | 0111 | |
| $C_4$ | 001110 | |
| $C_5$ | 0011110101 | |
| $C_6$ | 001111010011011 | |
| $C_7$ | 001111010011010 | |
| $C_8$ | 001111010001111 | |
| R(2) | 00110 | |
| R(3) | 01100 | |
| R(4) | 01101 | |
| R(5) | 0011111 | |
| R(6) | 00111100 | |
| R(7) | 001111011 | |
| R(8) | 001111010000 | |
| R(9) | 0011110100010 | |
| R(10) | 001111010010 | |
| R(11) | 0011110100111 | |
| R(12) | 00111101001100 | |
| R(13) | 001111010001110 | |
| R(14) | 001111010001101 | |
| R(15) | 001111010001100 | |
| EOB | 000 | |

In Tables 4, 5, and 6, the Huffman code for any value within a class is represented by the class code combined with a sign bit and a fixed length select value when necessary. In Tables 5 and 6, EOB (end of block) indicates all the remaining Walsh transform coefficients for a block are zero. In Table 6, R(2) to R(15) indicate two to fifteen consecutive zeros respectively.

FIG. 12 shows a zigzag order for a four-by-four block of Walsh transform coefficients. With the pruning techniques described above and the order shown in FIG. 12, the last coefficients have the highest probability of being zero.

Channel encoder 1150 adds error checking codes. Channel buffer 1155 temporarily stores portions of the quadtree code so the rate of transmission does not exceed the capabilities of an output channel carrying the quadtree code.

FIG. 11 also shows a decoder portion which decodes quadtree codes which are received on an input channel. Channel buffer 1160 stores input qUadtree codes so that data is not lost when the transmission rate on the input channel temporarily exceeds the processing rate of the decoder. A channel decoder 1165 removes the transmission error encoding and checks for transmission errors. A source decoder 1170 decodes the Huffman coding of Walsh transform coefficients in the quadtree code and provides the decoded values to a QTWT decoder 1175. QTWT decoder 1175 identifies the blocks corresponding to the leaf nodes of the quadtree code, and performs an inverse Walsh transformation on the Walsh transform coefficients corresponding to the leaf nodes. The identified blocks are then filled with the values provided by the inverse Walsh transformations to form a difference image.

Adder 1185 combines the difference image with a shifted pixel map according to a received motion vector of a previous frame stored in frame buffer 1180 to generate a pixel map for a new frame. The new frame is then stored in frame buffer 1180 for use with the next difference image. The pixel map for the new frame also passes through a filter 1190 which can, for example, smooth discontinuities in the new frame. After filtering, the new frame is then displayed on display 1195. Alternatively, the new frame can be displayed without filtering.

The appendix contains listings of C language subroutines which encode and decode quadtree codes with embedded Walsh transform coefficients. For encoding, subroutine qtwt_quan_enco2D.c is the top level subroutine which calls the subroutines necessary for creating a quadtree code, quantizing, and variable length coding. Subroutine qtwt_grow_costt.c generates a balance quadtree. Subroutine qtwt_prune_costt.c prunes the quadtree. Subroutine output_bits.c forms and outputs the quadtree code.

For decoding, subroutine qtwt_quan_deco2D.c is the top level subroutine which calls the subroutines necessary for variable length decoding and reconstruction of a frame. Subroutine input_bits2D.c decodes a block from the Walsh code. Subroutines bits_to_matrix2D.c, input_bits2D.c, and input_bits.c variable length decode an input quadtree code.

The other subroutines are general purpose and can be used both during coding and decoding. Subroutine one_d_wt.c one_d_iwt.c performs a recursive one dimensional Walsh transformation and inverse Walsh transformation. Subroutine one_d_wt_rc.c performs a single step one dimensional Walsh transform. Subroutine two_d_iw.c and two_d_iwt.c perform a two dimensional (or matrix) Walsh transformation and inverse Walsh transform respectively.

Although the present invention has been described with reference to particular embodiments, the description is only an example of the invention's application and should not be taken as a limitation. In particular, even though much of preceding discussion was aimed at processing of video images and in particular pixel maps, present invention can be more generally applied to description of any array of two dimensional data structure.

APPENDIX

```
/* bits_to_matrix2D.c: subroutine to input bits and to
decode them into blocks;
              for Nt = 2;
                      Copyright
                      by Xiaonong Ran */
#include "input_bits2D.c"

void bits_to_matrix2D( temp_2d, init_v, flag1, fp_in,
code, length, step_size,
                    nn4, trunc, buffer_input,
bits_to_input, treeh )
float **temp_2d, **init_v, nn4;
int *flag1;
short *code, *length;
FILE *fp_in;
float step_size;    /* quantization step size. */
int *buffer_input, *bits_to_input;
struct entry *treeh;
{
    int k6, i6, j6, itemp, run_1, i1;

/* zigzag scaning */
    k6 = 0;
    i6 = 0; j6 = 0;

if( k6 < trunc*trunc-1 )
        input_bits2D( fp_in, treeh, bits_to_input,
buffer_input,
                    code, length, &itemp, &run_1 );
    if( run_1 > 0 ){
        temp_2d[i6][j6] = 0.0;
        run_1--;
        if( run_1 == 0 && k6 < trunc*trunc-1 )
        input_bits2D( fp_in, treeh, bits_to_input,
buffer_input,
                    code, length, &itemp,
&run_1 );
    }
    else{
        temp_2d[i6][j6] = itemp*step_size*nn4;
        if( k6 < trunc*trunc-1 )
        input_bits2D( fp_in, treeh, bits_to_input,
buffer_input,
                    code, length, &itemp, &run_1
);
    } while( i6 != trunc-1 || j6 != trunc-1 ){
```

```
if( i6 == 0 ){
    j6++; k6++;
    if( run_1 > 0 ){
    temp_2d[i6][j6] = 0.0;
    run_1--;
    if( run_1 == 0 && k6 < trunc*trunc-1 )
        input_bits2D( fp_in, treeh, bits_to_input, buffer_input,
                    code, length, &itemp, &run_1 );
    }
    else{
    temp_2d[i6][j6] = itemp*step_size*nn4;
    if( k6 < trunc*trunc-1 )
        input_bits2D( fp_in, treeh, bits_to_input, buffer_input,
                    code, length, &itemp, &run_1 );
    }
    for( i1 = j6-1; i1 > -1; i1-- ){
        j6--;
        i6++;
        k6++;
        if( run_1 > 0 ){
        temp_2d[i6][j6] = 0.0;
        run_1--;
        if( run_1 == 0 && k6 < trunc*trunc-1 )
            input_bits2D( fp_in, treeh, bits_to_input, buffer_input,
                        code, length, &itemp, &run_1 );
        }
        else{
        temp_2d[i6][j6] = itemp*step_size*nn4;
        if( k6 < trunc*trunc-1 )
            input_bits2D( fp_in, treeh, bits_to_input, buffer_input,
                        code, length, &itemp, &run_1 );
        }
    }
}
else if( j6 == 0 && i6 < trunc-1 ){
    i6++; k6++;
    if( run_1 > 0 ){
    temp_2d[i6][j6] = 0.0;
    run_1--;
    if( run_1 == 0 && k6 < trunc*trunc-1 )
        input_bits2D( fp_in, treeh, bits_to_input, buffer_input,
                    code, length, &itemp, &run_1 );
    }
    else{
    temp_2d[i6][j6] = itemp*step_size*nn4;
    if( k6 < trunc*trunc-1 )
        input_bits2D( fp_in, treeh, bits_to_input, buffer_input,
                    code, length, &itemp, &run_1 );
    }
    for( i1 = i6-1; i1 > -1; i1-- ){
```

```
                    i6--;
                    j6++;
                    k6++;
                    if( run_1 > 0 ){
                    temp_2d[i6][j6] = 0.0;
                    run_1--;
                    if( run_1 == 0 && k6 < trunc*trunc-1 )
                       input_bits2D( fp_in, treeh, bits_to_input,
buffer_input,
                              code, length, &itemp, &run_1 );
                    }
                    else{
                    temp_2d[i6][j6] = itemp*step_size*nn4;
                    if( k6 < trunc*trunc-1 )
                       input_bits2D( fp_in, treeh, bits_to_input,
buffer_input,
                              code, length, &itemp, &run_1 );
                    }
                }
            }
            else if( i6 == trunc-1 ){
                j6++; k6++;
                if( run_1 > 0 ){
                temp_2d[i6][j6] = 0.0;
                run_1--;
                if( run_1 == 0 && k6 < trunc*trunc-1 )
                   input_bits2D( fp_in, treeh, bits_to_input,
buffer_input,
                          code, length, &itemp, &run_1 );
                }
                else{
                temp_2d[i6][j6] = itemp*step_size*nn4;
                if( k6 < trunc*trunc-1 )
                   input_bits2D( fp_in, treeh, bits_to_input,
buffer_input,
                          code, length, &itemp, &run_1 );
                }
                for( i1 = j6+1; i1 < trunc; i1++ ){
                    i6--;
                    j6++;
                    k6++;
                    if( run_1 > 0 ){
                    temp_2d[i6][j6] = 0.0;
                    run_1--;
                    if( run_1 == 0 && k6 < trunc*trunc-1 )
                       input_bits2D( fp_in, treeh, bits_to_input,
buffer_input,
                              code, length, &itemp, &run_1 );
                    }
                    else{
                    temp_2d[i6][j6] = itemp*step_size*nn4;
                    if( k6 < trunc*trunc-1 )
                       input_bits2D( fp_in, treeh, bits_to_input,
buffer_input,
                              code, length, &itemp, &run_1 );
                    }
```

```
            }
        }
        else if( j6 == trunc-1 ){
            i6++; k6++;
            if(  run_1 > 0 ){
            temp_2d[i6][j6] = 0.0;
            run_1--;
            if( run_1 == 0 && k6 < trunc*trunc-1 )
                input_bits2D( fp_in, treeh, bits_to_input,
buffer_input,
                        code, length, &itemp, &run_1 );
            }
            else{
            temp_2d[i6][j6] = itemp*step_size*nn4;
            if( k6 < trunc*trunc-1 )
                input_bits2D( fp_in, treeh, bits_to_input,
buffer_input,
                        code, length, &itemp, &run_1 );
            }
            for( i1 = i6+1; i1 < trunc; i1++ ){
                i6++;
                j6--;
                k6++;
                if(  run_1 > 0 ){
                temp_2d[i6][j6] = 0.0;
                run_1--;
                if( run_1 == 0 && k6 < trunc*trunc-1 )
                    input_bits2D( fp_in, treeh, bits_to_input,
buffer_input,
                        code, length, &itemp, &run_1 );
                }
                else{
                temp_2d[i6][j6] = itemp*step_size*nn4;
                if( k6 < trunc*trunc-1 )
                    input_bits2D( fp_in, treeh, bits_to_input,
buffer_input,
                        code, length, &itemp, &run_1 );
                }
            }
        }
    }
/* end of zigzag scaning */
}

/*input_bits.c: subroutine to input bits and to variable
length decode them into
            indices.

Copyright
                    by Xiaonong Ran   */ void input_bits( fp_in, hufftree, bits_to_input,
buffer_input,
```

```
                              code, length, index_out )
FILE *fp_in;
struct entry *hufftree;
int *bits_to_input, *buffer_input, *code, *length,
*index_out;
{
     struct entry *tree_pointer;
     tree_pointer = hufftree;
     while( tree_pointer->flag_node == 0 ){
        if( *bits_to_input == 0 ){            /* Read the
next byte if*/
           *buffer_input = getc( fp_in );  /* bits are
left in buffer*/
           *bits_to_input = 8;
        }
        if( *buffer_input & 1 )
           tree_pointer = tree_pointer->leaf1;
        else
           tree_pointer = tree_pointer->leaf0;
        *buffer_input >>= 1;
        *bits_to_input -= 1;
     }
     *index_out = tree_pointer->index;
}

/*input_bits2D.c: subroutine to input bits and to decode
them into quantized
          values, run-lengths and EOBs; for Nt=2.

#include "input_bits.c"
                    Copyright
                    by Xiaonong Ran   */ void input_bits2D( fp_in, hufftree, bits_to_input,
buffer_input,
                    code, length, index, run_len )
FILE *fp_in;
struct entry *hufftree;
int *bits_to_input, *buffer_input, *code, *length, *index,
*run_len;
{
     int itemp, index_out, sign_i, i2;

input_bits( fp_in, hufftree, bits_to_input,
buffer_input,
                                                    code,
length, &index_out );

*run_len = 0;
        if( index_out == 0 ) {
        *run_len = 4;    /* for EOB       */
     }
        else if( index_out == 1 ){
```

```
            itemp = index_out-1;
            *index = itemp;
        }
        else if( index_out < 7 ){
            itemp = index_out-1;
            if( *bits_to_input == 0 ){
                *buffer_input = getc( fp_in );
                *bits_to_input = 8;
            }
            if( *buffer_input & 1 ) sign_i = 1;
            else sign_i = -1;
            *buffer_input >>= 1;
            *bits_to_input -= 1;
            itemp *= (-1)*sign_i;
            *index = itemp;
        }
        else if( index_out < 10 ){
            itemp = index_out-4;
            if( *bits_to_input == 0 ){
                *buffer_input = getc( fp_in );
                *bits_to_input = 8;
            }
            if( *buffer_input & 1 ) sign_i = 1;
            else sign_i = -1;
            *buffer_input >>= 1;
            *bits_to_input -= 1;
            for( i2 = 0; i2 < 1; i2++ ){
                if( *bits_to_input == 0 ){
                    *buffer_input = getc( fp_in );
                    *bits_to_input = 8;
                }
                itemp <<= 1;
                if( *buffer_input & 1 ) itemp += 1;
                *buffer_input >>= 1;
                *bits_to_input -= 1;
            }
            itemp *= (-1)*sign_i;
            *index = itemp;
        }
        else if( index_out < 15 ){
            itemp = index_out-7;
            if( *bits_to_input == 0 ){
                *buffer_input = getc( fp_in );
                *bits_to_input = 8;
            }
            if( *buffer_input & 1 ) sign_i = 1;
            else sign_i = -1;
            *buffer_input >>= 1;
            *bits_to_input -= 1;
            for( i2 = 0; i2 < 2; i2++ ){
                if( *bits_to_input == 0 ){
                    *buffer_input = getc( fp_in );
                    *bits_to_input = 8;
                }
                itemp <<= 1;
                if( *buffer_input & 1 ) itemp += 1;
                *buffer_input >>= 1;
```

```
            *bits_to_input -= 1;
        }
        itemp *= (-1)*sign_i;
        *index = itemp;
    }
    else{
        itemp = 1;
        if( *bits_to_input == 0 ){
            *buffer_input = getc( fp_in );
            *bits_to_input = 8;
        }
        if( *buffer_input & 1 ) sign_i = 1;
        else sign_i = -1;
        *buffer_input >>= 1;
        *bits_to_input -= 1;
        for( i2 = 0; i2 < index_out-10; i2++ ){
            if( *bits_to_input == 0 ){
                *buffer_input = getc( fp_in );
                *bits_to_input = 8;
            }
            itemp <<= 1;
            if( *buffer_input & 1 ) itemp += 1;
            *buffer_input >>= 1;
            *bits_to_input -= 1;
        }
        itemp *= (-1)*sign_i;
        *index = itemp;
    }
}

/*one_d_iwt.c: subroutine to perform complete fast
recursive 1-D inverse Walsh
        Transform.

Copyright
                        by Xiaonong Ran   */ void one_d_iwt_2( trans_in, trunc_1, data_out, flag )
float *trans_in;     /* trans_in: 1-D trans. coeff. array
in.*/
int trunc_1;         /* traunc_1: size of transform
coefficients computed.*/
float *data_out;     /* data_out: 1-D data array out.*/
int flag;        /* flag=1: the last recursive stage with the
factor 1/2*/
{
    float temp[2];

if( trunc_1 >= 2 ){
        temp[0] = trans_in[0] + trans_in[1];
```

```c
        temp[1] = trans_in[0] - trans_in[1];
        data_out[0] = temp[0];
        data_out[1] = temp[1];
    }
    else if( trunc_l == 1 ){
        data_out[0] = trans_in[0];
        data_out[1] = trans_in[0];
    }
    else {
        data_out[0] = 0.0;
        data_out[1] = 0.0;
            return;
    } if( flag == 1 ){
        data_out[0] /= 2.0;
        data_out[1] /= 2.0;
    }
} void one_d_iwt_4( trans_in, trunc_l, data_out, flag )
float *trans_in;       /* trans_in: 1-D trans. coeff. array in.*/
int trunc_l;           /* traunc_l: size of transform coefficients to be computed.*/
float *data_out;       /* data_out: 1-D data array out.*/
int flag;              /* flag=1: the last recursive stage with the factor 1/2*/
{
    float temp[4];

if( trunc_l >= 4 ){
        one_d_iwt_2( trans_in, 2, trans_in, 0 );
        one_d_iwt_2( trans_in+2, 2, trans_in+2, 0 );

temp[0] = trans_in[0] + trans_in[2];
        temp[1] = trans_in[0] - trans_in[2];
        temp[2] = trans_in[1] - trans_in[3];
        temp[3] = trans_in[1] + trans_in[3];
    }
    else if( trunc_l == 3 ){
        one_d_iwt_2( trans_in, 2, trans_in, 0 );
        one_d_iwt_2( trans_in+2, 1, trans_in+2, 0 );

temp[0] = trans_in[0] + trans_in[2];
        temp[1] = trans_in[0] - trans_in[2];
        temp[2] = trans_in[1] - trans_in[3];
        temp[3] = trans_in[1] + trans_in[3];
    }
    else if( trunc_l == 2 ){
        one_d_iwt_2( trans_in, 2, trans_in, 0 );

temp[0] = trans_in[0];
```

```
        temp[1] = trans_in[0];
        temp[2] = trans_in[1];
        temp[3] = trans_in[1];
    }
    else if( trunc_l == 1 ){
        one_d_iwt_2( trans_in, 1, trans_in, 0 );

temp[0] = trans_in[0];
        temp[1] = trans_in[0];
        temp[2] = trans_in[1];
        temp[3] = trans_in[1];
    }
    else {
        data_out[0] = 0.0;
        data_out[1] = 0.0;
        data_out[2] = 0.0;
        data_out[3] = 0.0;
            return;
    } if( flag == 1 ){
        data_out[0] = temp[0]/4.0;
        data_out[1] = temp[1]/4.0;
        data_out[2] = temp[2]/4.0;
        data_out[3] = temp[3]/4.0;
    }
    else {
        data_out[0] = temp[0];
        data_out[1] = temp[1];
        data_out[2] = temp[2];
        data_out[3] = temp[3];
    }
} void one_d_iwt_8( trans_in, trunc_l, data_out, flag )
float *trans_in;      /* trans_in: 1-D trans. coeff. array
in.*/
int trunc_l;          /* traunc_l: size of transform
coefficients to be computed.*/
float *data_out;      /* data_out: 1-D data array out.*/
int flag;       /* flag=1: the last recursive stage with the
factor 1/2*/
{
    float temp[8];
    int i, j, sign;

if( trunc_l == 0 ) {
        for( i = 0; i < 8; i++ ) data_out[i] = 0.0;
        return;
    } i = trunc_l - 4;
    if( i >= 0 ) j = 4;
```

```c
        else {
            j = trunc_l; i = 0;
        } one_d_iwt_4( trans_in, j, trans_in, 0 );
        one_d_iwt_4( (trans_in+4), i, (trans_in+4), 0 );

if( i == 0 )
            for( i = 0; i < 8; i++ ){
                j = i/2;
                temp[i] = trans_in[j];
            }
        else
            for( i = 0; i < 8; i++ ){
                j = i/2;
                if( (((int)((i+1)/2)) & 1) > 0 ) sign = -1;
                else sign = 1;
                temp[i] = trans_in[j] + sign*trans_in[j+4];
            } if( flag == 1 )
            for( i = 0; i < 8; i++ ) data_out[i] = temp[i]/8.0;
        else
            for( i = 0; i < 8; i++ ) data_out[i] = temp[i];
} void one_d_iwt_16( trans_in, trunc_l, data_out, flag )
float *trans_in;       /* trans_in: 1-D trans. coeff. array in.*/
int trunc_l;           /* traunc_l: size of transform coefficients to be computed.*/
float *data_out;       /* data_out: 1-D data array out.*/
int flag;              /* flag=1: the last recursive stage with the factor 1/2*/
{
        float temp[16];
        int i, j, sign;

if( trunc_l == 0 ) {
            for( i = 0; i < 16; i++ ) data_out[i] = 0.0;
            return;
        } i = trunc_l - 8;
        if( i >= 0 ) j = 8;
        else {
            j = trunc_l; i = 0;
        } one_d_iwt_8( trans_in, j, trans_in, 0 );
        one_d_iwt_8( (trans_in+8), i, (trans_in+8), 0 );
```

```
        if( i == 0 )
            for( i = 0; i < 16; i++ ){
              j = i/2;
              temp[i] = trans_in[j];
            }
        else
            for( i = 0; i < 16; i++ ){
              j = i/2;
              if( (((int)((i+1)/2)) & 1) > 0 ) sign = -1;
              else sign = 1;
              temp[i] = trans_in[j] + sign*trans_in[j+8];
            } if( flag == 1 )
            for( i = 0; i < 16; i++ ) data_out[i] = temp[i]/16.0;
        else
            for( i = 0; i < 16; i++ ) data_out[i] = temp[i];
} void one_d_iwt_32( trans_in, trunc_1, data_out, flag )
float *trans_in;       /* trans_in: 1-D trans. coeff. array in.*/
int trunc_1;           /* traunc_1: size of transform coefficients to be computed.*/
float *data_out;       /* data_out: 1-D data array out.*/
int flag;              /* flag=1: the last recursive stage with the factor 1/2*/
{
        float temp[32];
        int i, j, sign;

if( trunc_1 == 0 ) {
            for( i = 0; i < 32; i++ ) data_out[i] = 0.0;
            return;
        } i = trunc_1 - 16;
        if( i >= 0 ) j = 16;
        else {
            j = trunc_1; i = 0;
        } one_d_iwt_16( trans_in, j, trans_in, 0 );
        one_d_iwt_16( (trans_in+16), i, (trans_in+16), 0 );

if( i == 0 )
            for( i = 0; i < 32; i++ ){
              j = i/2;
              temp[i] = trans_in[j];
            }
        else
            for( i = 0; i < 32; i++ ){
```

```
                j = i/2;
                if( (((int)((i+1)/2)) & 1) > 0 ) sign = -1;
                else sign = 1;
                temp[i] = trans_in[j] + sign*trans_in[j+16];
            } if( flag == 1 )
            for( i = 0; i < 32; i++ ) data_out[i] =
temp[i]/32.0;
        else
            for( i = 0; i < 32; i++ ) data_out[i] = temp[i];
} void one_d_iwt_64( trans_in, trunc_1, data_out, flag )
float *trans_in;    /* trans_in: 1-D trans. coeff. array
in.*/
int trunc_1;        /* traunc_1: size of transform
coefficients to be computed.*/
float *data_out;    /* data_out: 1-D data array out.*/
int flag;           /* flag=1: the last recursive stage with the
factor 1/2*/
{
    float temp[64];
    int i, j, sign;

if( trunc_1 == 0 ) {
        for( i = 0; i < 64; i++ ) data_out[i] = 0.0;
        return;
    } i = trunc_1 - 32;
    if( i >= 0 ) j = 32;
    else {
        j = trunc_1; i = 0;
    } one_d_iwt_32( trans_in, j, trans_in, 0 );
    one_d_iwt_32( (trans_in+32), i, (trans_in+32), 0 );

if( i == 0 )
        for( i = 0; i < 64; i++ ){
            j = i/2;
            temp[i] = trans_in[j];
        }
    else
        for( i = 0; i < 64; i++ ){
            j = i/2;
            if( (((int)((i+1)/2)) & 1) > 0 ) sign = -1;
            else sign = 1;
            temp[i] = trans_in[j] + sign*trans_in[j+32];
        } if( flag == 1 )
```

```
        for( i = 0; i < 64; i++ ) data_out[i] =
temp[i]/64.0;
    else
        for( i = 0; i < 64; i++ ) data_out[i] = temp[i];
} void one_d_iwt( trans_in, size, trunc_1, data_out )
float *trans_in;    /* trans_in: 1-D trans. coeff. array
in.*/
int size;      /* size: size of the 1-D trans. coeff.
array.*/
int trunc_1;       /* traunc_1: size of transform
coefficients to be computed.*/
float *data_out;    /* data_out: 1-D data array out.*/
{
        switch (size)
        {
          case 2:
            one_d_iwt_2( trans_in, trunc_1, data_out, 1 );
                break;
          case 4:
            one_d_iwt_4( trans_in, trunc_1, data_out, 1 );
                break;
          case 8:
            one_d_iwt_8( trans_in, trunc_1, data_out, 1 );
                break;
          case 16:
            one_d_iwt_16( trans_in, trunc_1, data_out, 1 );
                break;
          case 32:
            one_d_iwt_32( trans_in, trunc_1, data_out, 1 );
                break;
          case 64:
            one_d_iwt_64( trans_in, trunc_1, data_out, 1 );
                break;
          default:
            printf("Walsh Transform uses size 2, 4, 8, 16,
32 or 64 here\n");
                break;
        }
}

/*one_d_wt.c: subroutine to perform complete fast
recursive 1-D Walsh Transform.

Copyright
                        by Xiaonong Ran    */ void one_d_wt_2( data_in, trunc_1, trans_out )
float *data_in;         /* data_in: 1-D data array in.*/
```

```
int trunc_1;        /* traunc_1: size of transform
coefficients to be computed.*/
float *trans_out;   /* trans_out: 1-D transform
coefficient array out.*/
{
    float temp[2];

if( trunc_1 >= 2 ){
        temp[0] = data_in[0] + data_in[1];
        temp[1] = data_in[0] - data_in[1];
        trans_out[0] = temp[0];
        trans_out[1] = temp[1];
    }
    else if( trunc_1 == 1 ){
        trans_out[0] = data_in[0] + data_in[1];
    }
} void one_d_wt_4( data_in, trunc_1, trans_out )
float *data_in;         /* data_in: 1-D data array in.*/
int trunc_1;        /* traunc_1: size of transform
coefficients to be computed.*/
float *trans_out;   /* trans_out: 1-D transform
coefficient array out.*/
{
    float temp[4];
    int trunc_10;

trunc_10 = (trunc_1-1) / 2 + 1;

one_d_wt_2( data_in, trunc_10, data_in );
    one_d_wt_2( data_in+2, trunc_10, data_in+2 );

if( trunc_1 >= 4 ){
        temp[0] = data_in[0] + data_in[2];
        temp[1] = data_in[0] - data_in[2];
        temp[2] = data_in[1] - data_in[3];
        temp[3] = data_in[1] + data_in[3];
        trans_out[0] = temp[0];
        trans_out[1] = temp[1];
        trans_out[2] = temp[2];
        trans_out[3] = temp[3];
    }
    else if( trunc_1 == 3 ){
        temp[0] = data_in[0] + data_in[2];
        temp[1] = data_in[0] - data_in[2];
        temp[2] = data_in[1] - data_in[3];
        trans_out[0] = temp[0];
        trans_out[1] = temp[1];
        trans_out[2] = temp[2];
    }
    else if( trunc_1 == 2 ){
        temp[0] = data_in[0] + data_in[2];
```

```
        temp[1] = data_in[0] - data_in[2];
        trans_out[0] = temp[0];
        trans_out[1] = temp[1];
    }
    else if( trunc_1 == 1 ){
        temp[0] = data_in[0] + data_in[2];
        trans_out[0] = temp[0];
    }
} void one_d_wt_8( data_in, trunc_1, trans_out )
float *data_in;          /* data_in: 1-D data array in.*/
int trunc_1;         /* traunc_1: size of transform
coefficients to be computed.*/
float *trans_out;    /* trans_out: 1-D transform
coefficient array out.*/
{
    float temp[8];
    int trunc_10, i, j, sign;

trunc_10 = (trunc_1-1) / 2 + 1;

one_d_wt_4( data_in, trunc_10, data_in );
    one_d_wt_4( (data_in+4), trunc_10, (data_in+4) );

if( trunc_1 > 8 ) trunc_1 = 8;
    for( i = 0; i < trunc_1; i++ ){
        j = i/2;
        if( (((int)((i+1)/2)) & 1) > 0 ) sign = -1;
        else sign = 1;
        temp[i] = data_in[j] + sign*data_in[j+4];
    }
    for( i = 0; i < trunc_1; i++ )
        trans_out[i] = temp[i];
} void one_d_wt_16( data_in, trunc_1, trans_out )
float *data_in;          /* data_in: 1-D data array in.*/
int trunc_1;         /* traunc_1: size of transform
coefficients to be computed.*/
float *trans_out;    /* trans_out: 1-D transform
coefficient array out.*/
{
    float temp[16];
    int trunc_10, i, j, sign;

trunc_10 = (trunc_1-1) / 2 + 1;

one_d_wt_8( data_in, trunc_10, data_in );
    one_d_wt_8( (data_in+8), trunc_10, (data_in+8) );

if( trunc_1 > 16 ) trunc_1 = 16;
    for( i = 0; i < trunc_1; i++ ){
```

```
            j = i/2;
            if( (((int)((i+1)/2)) & 1) > 0 ) sign = -1;
            else sign = 1;
            temp[i] = data_in[j] + sign*data_in[j+8];
        }
        for( i = 0; i < trunc_l; i++ )
            trans_out[i] = temp[i];
} void one_d_wt_32( data_in, trunc_l, trans_out )
float *data_in;         /* data_in: 1-D data array in.*/
int trunc_l;            /* traunc_l: size of transform
coefficients to be computed.*/
float *trans_out;       /* trans_out: 1-D transform
coefficient array out.*/
{
        float temp[32];
        int trunc_l0, i, j, sign;

trunc_l0 = (trunc_l-1) / 2 + 1;

one_d_wt_16( data_in, trunc_l0, data_in );
        one_d_wt_16( (data_in+16), trunc_l0, (data_in+16) );

if( trunc_l > 32 ) trunc_l = 32;
        for( i = 0; i < trunc_l; i++ ){
            j = i/2;
            if( (((int)((i+1)/2)) & 1) > 0 ) sign = -1;
            else sign = 1;
            temp[i] = data_in[j] + sign*data_in[j+16];
        }
        for( i = 0; i < trunc_l; i++ )
            trans_out[i] = temp[i];
} void one_d_wt_64( data_in, trunc_l, trans_out )
float *data_in;         /* data_in: 1-D data array in.*/
int trunc_l;            /* traunc_l: size of transform
coefficients to be computed.*/
float *trans_out;       /* trans_out: 1-D transform
coefficient array out.*/
{
        float temp[64];
        int trunc_l0, i, j, sign;

trunc_l0 = (trunc_l-1) / 2 + 1;

one_d_wt_32( data_in, trunc_l0, data_in );
        one_d_wt_32( (data_in+32), trunc_l0, (data_in+32) );

if( trunc_l > 64 ) trunc_l = 64;
        for( i = 0; i < trunc_l; i++ ){
            j = i/2;
```

```
                if( (((int)((i+1)/2)) & 1) > 0 ) sign = -1;
                else sign = 1;
                temp[i] = data_in[j] + sign*data_in[j+32];
        }
        for( i = 0; i < trunc_1; i++ )
                trans_out[i] = temp[i];
} void one_d_wt( data_in, size, trunc_1, trans_out )
float *data_in;         /* data_in: 1-D data array in.*/
int size;       /* size: size of the 1-D data array.*/
int trunc_1;    /* traunc_1: size of transform
coefficients to be computed.*/
float *trans_out;       /* trans_out: 1-D transform
coefficient array out.*/
{
        switch (size)
        {
          case 2:
            one_d_wt_2( data_in, trunc_1, trans_out );
                break;
          case 4:
            one_d_wt_4( data_in, trunc_1, trans_out );
                break;
          case 8:
            one_d_wt_8( data_in, trunc_1, trans_out );
                break;
          case 16:
            one_d_wt_16( data_in, trunc_1, trans_out );
                break;
          case 32:
            one_d_wt_32( data_in, trunc_1, trans_out );
                break;
          case 64:
            one_d_wt_64( data_in, trunc_1, trans_out );
                break;
          default:
            printf("Walsh Transform uses size 2, 4, 8, 16,
32 or 64 here\n");
                break;
        }
}

/*one_d_wt_rc.c: subroutine to perform single step fast
1-D RECURSIVE Walsh
        Transform.
                                Copyright
                                by Xiaonong Ran   */ void one_d_wt_2_rc( data_in1, data_in2, trunc_1, trans_out
```

```
)
float *data_in1,  *data_in2;    /* Two 1-D data sub-arrays
in.*/
int trunc_1;       /* traunc_1: size of transform
coefficients to be computed.*/
float *trans_out;   /* trans_out: 1-D transform
coefficient array out.*/
{
    float temp[2];

if( trunc_1 >= 2 ){
        temp[0] = data_in1[0] + data_in2[0];
        temp[1] = data_in1[0] - data_in2[0];
        trans_out[0] = temp[0];
        trans_out[1] = temp[1];
    }
    else if( trunc_1 == 1 ){
        trans_out[0] = data_in1[0] + data_in2[0];
    }
} void one_d_wt_4_rc( data_in1, data_in2, trunc_1, trans_out
)
float *data_in1, *data_in2;     /* Two 1-D data sub-arrays
in.*/
int trunc_1;       /* traunc_1: size of transform
coefficients to be computed.*/
float *trans_out;   /* trans_out: 1-D transform
coefficient array out.*/
{
    float temp[4];

if( trunc_1 >= 4 ){
        temp[0] = data_in1[0] + data_in2[0];
        temp[1] = data_in1[0] - data_in2[0];
        temp[2] = data_in1[1] - data_in2[1];
        temp[3] = data_in1[1] + data_in2[1];
        trans_out[0] = temp[0];
        trans_out[1] = temp[1];
        trans_out[2] = temp[2];
        trans_out[3] = temp[3];
    }
    else if( trunc_1 == 3 ){
        temp[0] = data_in1[0] + data_in2[0];
        temp[1] = data_in1[0] - data_in2[0];
        temp[2] = data_in1[1] - data_in2[1];
        trans_out[0] = temp[0];
        trans_out[1] = temp[1];
        trans_out[2] = temp[2];
    }
    else if( trunc_1 == 2 ){
        temp[0] = data_in1[0] + data_in2[0];
        temp[1] = data_in1[0] - data_in2[0];
```

```
            trans_out[0] = temp[0];
            trans_out[1] = temp[1];
        }
        else if( trunc_1 == 1 ){
            temp[0] = data_in1[0] + data_in2[0];
            trans_out[0] = temp[0];
        }
} void one_d_wt_8_rc( data_in1, data_in2, trunc_1, trans_out
)
float *data_in1, *data_in2;    /* Two 1-D data sub-arrays
in.*/
int trunc_1;        /* traunc_1: size of transform
coefficients to be computed.*/
float *trans_out;   /* trans_out: 1-D transform
coefficient array out.*/
{
        float temp[8];
        int i, j, sign;

if( trunc_1 > 8 ) trunc_1 = 8;
        for( i = 0; i < trunc_1; i++ ){
            j = i/2;
            if( (((int)((i+1)/2)) & 1) > 0 ) sign = -1;
            else sign = 1;
            temp[i] = data_in1[j] + sign*data_in2[j];
        }
        for( i = 0; i < trunc_1; i++ )
            trans_out[i] = temp[i];
} void one_d_wt_16_rc( data_in1, data_in2, trunc_1,
trans_out )
float *data_in1, *data_in2;    /* Two 1-D data sub-arrays
in.*/
int trunc_1;        /* traunc_1: size of transform
coefficients to be computed.*/
float *trans_out;   /* trans_out: 1-D transform
coefficient array out.*/
{
        float temp[16];
        int i, j, sign;

if( trunc_1 > 16 ) trunc_1 = 16;
        for( i = 0; i < trunc_1; i++ ){
            j = i/2;
            if( (((int)((i+1)/2)) & 1) > 0 ) sign = -1;
            else sign = 1;
            temp[i] = data_in1[j] + sign*data_in2[j];
        }
        for( i = 0; i < trunc_1; i++ )
            trans_out[i] = temp[i];
```

}

```
void one_d_wt_32_rc( data_in1, data_in2, trunc_1,
trans_out )
float *data_in1, *data_in2;    /* Two 1-D data sub-arrays
in.*/
int trunc_1;       /* traunc_1: size of transform
coefficients to be computed.*/
float *trans_out;   /* trans_out: 1-D transform
coefficient array out.*/
{
     float temp[32];
     int i, j, sign;

if( trunc_1 > 32 ) trunc_1 = 32;
     for( i = 0; i < trunc_1; i++ ){
          j = i/2;
          if( (((int)((i+1)/2)) & 1) > 0 ) sign = -1;
          else sign = 1;
          temp[i] = data_in1[j] + sign*data_in2[j];
     }
     for( i = 0; i < trunc_1; i++ )
          trans_out[i] = temp[i];
} void one_d_wt_64_rc( data_in1, data_in2, trunc_1,
trans_out )
float *data_in1, *data_in2;    /* Two 1-D data sub-arrays
in.*/
int trunc_1;       /* traunc_1: size of transform
coefficients to be computed.*/
float *trans_out;   /* trans_out: 1-D transform
coefficient array out.*/
{
     float temp[64];
     int i, j, sign;

if( trunc_1 > 64 ) trunc_1 = 64;
     for( i = 0; i < trunc_1; i++ ){
          j = i/2;
          if( (((int)((i+1)/2)) & 1) > 0 ) sign = -1;
          else sign = 1;
          temp[i] = data_in1[j] + sign*data_in2[j];
     }
     for( i = 0; i < trunc_1; i++ )
          trans_out[i] = temp[i];
} void one_d_wt_rc( data_in1, data_in2, size, trunc_1,
trans_out )
float *data_in1, *data_in2;    /* Two 1-D data sub-arrays
in.*/
int size;      /* size: size of the 1-D data array.*/
```

```
int trunc_1;         /* traunc_1: size of transform
coefficients to be computed.*/
float *trans_out;    /* trans_out: 1-D transform
coefficient array out.*/
{
        switch (size)
        {
          case 2:
        one_d_wt_2_rc( data_in1, data_in2, trunc_1,
trans_out );
                break;
          case 4:
        one_d_wt_4_rc( data_in1, data_in2, trunc_1,
trans_out );
                break;
          case 8:
        one_d_wt_8_rc( data_in1, data_in2, trunc_1,
trans_out );
                break;
          case 16:
        one_d_wt_16_rc( data_in1, data_in2, trunc_1,
trans_out );
                break;
          case 32:
        one_d_wt_32_rc( data_in1, data_in2, trunc_1,
trans_out );
                break;
          case 64:
        one_d_wt_64_rc( data_in1, data_in2, trunc_1,
trans_out );
                break;
          default:
        printf("Walsh Transform uses size 2, 4, 8, 16,
32 or 64 here\n");
                break;
        }
}

/*output_bits.c: subroutine to output binary bits.

Copyright
                        by Xiaonong Ran    */ void output_bits( fp_out, buffer_output, bits_to_out,
code, length )
FILE *fp_out;
int *buffer_output, *bits_to_out, code, length;
{
     int i, itemp, out_temp;
```

```
        itemp = code;
            itemp <<= (32-length);
        for( i = 0; i < length; i++ ){
            (*buffer_output) >>= 1;
            if( (itemp & 0x80000000) ) (*buffer_output) |= 0x80;
            (*bits_to_out) -= 1;
            itemp <<= 1;
            if( *bits_to_out == 0 ){
              out_temp = *buffer_output;      /*Output buffer if it is*/
              putc(out_temp,fp_out);           /* now full. */
              *bits_to_out = 8;
            }
        }
}
```

```
/*qtwt_grow_costt.c: subroutine to generate the balanced
quadtree in performing
            Walsh Transform Quadtree decomposition for all Nt.

Copyright
                            by Xiaonong Ran  */ void qtwt_grow_costt(
frame,row,column,nn,mm,trunc,costt,wtt )
short **frame;      /* the current (MCP) frame. */
float ****costt;    /* tree of merging-cost:
                    index 1,2: root-blocks;
                    index 3: levels of quad-trees, bottom-up;
                    index 4: nodes */
float ******wtt;    /* tree of Walsh transform coefficients:
                    index 1,2: root-blocks;
                    index 3: levels of quad-trees, bottom-up;
                    index 4: nodes
                    index 5,6: coefficient block */
int row, column;    /* frame sizes */
int mm, nn;         /* mm (nn): the size of the smallest leaf (root) block.
                    mm must be larger than size of truncated transform blocks*/
int trunc;          /* trunc: the size of truncated transform blocks.*/
{
    int r_nn, c_nn, ii, jj;
    int i, j, j1, j2, k, l1, l2, l1_log, mm2, mm3;
    int a1, a2, b1, b2, c1, c2, cv, cq, trunc2;
```

```
        float temp, **temp_2d;
          short *qt_codet; /* temperary memory for qt_code
*/ r_nn = row / nn;
    c_nn = column / nn;
    l1 = nn/mm;
    l1_log = (int) ( log2((double)l1) + 0.5 ); /* number
of stages after
                                        root for the quadtree*/
    l2 = l1*l1;   /*number of possible leaf nodes and
the size of tran_v*/
    k = (l2-1)/3;   /*size of the quadtree code*/
    trunc2 = 2*trunc;

if( k > 0 )
        if( (qt_codet = (short *) calloc( k,
sizeof(short)))==NULL ){
            fprintf( stderr, "wc: no more memory\n" );
            exit( 0 );
        } if( (temp_2d = (float **) calloc( 2*mm,
sizeof(float *)))==NULL ){
            fprintf( stderr, "wc: no more memory\n" );
            exit( 0 );
        }
    for( i = 0; i < 2*mm; i++ )
        if( (temp_2d[i] = (float *) calloc( 2*mm,
sizeof(float )))==NULL){
            fprintf( stderr, "wc: no more memory\n" );
            exit( 0 );
        } for( ii = 0; ii < r_nn; ii++ )
      for( jj = 0; jj < c_nn; jj++ ){

/* put transf. block of the basic blocks in an 1-D array
in Z-scan order. */ for( i = 0; i < l2; i++ ){
        j1 = 0;
        j2 = 0;
        for( j = 0; j <= l1_log; j++ ){
        j1 += ( (i>>(2*j+1))&1 )<<j;
        j2 += ( (i>>(2*j))&1 )<<j;
        }
        for( a1 = 0; a1 < mm; a1++ )
           for( a2 = 0; a2 < mm; a2++ )
        temp_2d[a1][a2] =
frame[ii*nn+j1*mm+a1][jj*nn+j2*mm+a2];
        two_d_wt( temp_2d, mm, mm, trunc, trunc,
```

```
        wtt[ii][jj][0][i] );
    }

/* construct the second last level of the quadtree,
                    (the last level are all leafs).*/ mm2 = mm*mm*mm*mm*16;
    mm3 = mm*2;
    for( j = 0; j < 12/4; j++ ){
        for( a1 = 0; a1 < trunc2; a1++ )
            for( a2 = 0; a2 < trunc2; a2++ )
                temp_2d[a1][a2] = 0.0;

two_d_wt_rc_1i(wtt[ii][jj][0][j*4],wtt[ii][jj][0][j*4+1],
                wtt[ii][jj][0][j*4+2],
wtt[ii][jj][0][j*4+3],
                mm3, mm3, trunc2, trunc2, temp_2d );
        temp = 0.0;
        for( a1 = 0; a1 < trunc2; a1++ )
            for( a2 = 0; a2 < trunc2; a2++ )
            if( a1 >= trunc || a2 >= trunc )
                temp += temp_2d[a1][a2]*temp_2d[a1][a2];
        temp /= (float)mm2;/* divide by 4*(2*mm)**2 (2nd
stage)*/
        costt[ii][jj][0][j] = temp;
        if( 0==0 ){
            qt_codet[j] = 0;
            for( a1 = 0; a1 < trunc; a1++ )
                for( a2 = 0; a2 < trunc; a2++ )
                    wtt[ii][jj][1][j][a1][a2] =
temp_2d[a1][a2];
        }
    }
    b1 = 0;          /* store the starting and ending
points of this level*/
    b2 = j;          /* of quadtree code. */

/* construct all the upper levels of the quadtree. */ c1 = 16;
    for( i = 11_log-2; i >= 0; i-- ){
        c2 = c1/4;
        mm2 *= 16;
        mm3 *= 2;
        for( j = 0; j < 12/c1; j++ ){
            if( qt_codet[j*4+b1] == 0 &&
qt_codet[j*4+b1+1] == 0 &&
                qt_codet[j*4+b1+2] == 0 &&
qt_codet[j*4+b1+3] == 0 ){
                for( a1 = 0; a1 < trunc2; a1++ )
                    for( a2 = 0; a2 < trunc2; a2++ )
                        temp_2d[a1][a2] = 0.0;
                two_d_wt_rc_1i( wtt[ii][jj][11_log-1-i][j*4],
```

```
wtt[ii][jj][ll_log-1-i][j*4+1],wtt[ii][jj][ll_log-1-i][j*4
+2], wtt[ii][jj][ll_log-1-i][j*4+3],mm3,mm3,trunc2,trunc2,temp_
2d);
                temp = 0.0;
                for( a1 = 0; a1 < trunc2; a1++ )
                  for( a2 = 0; a2 < trunc2; a2++ )
                    if( a1 >= trunc || a2 >= trunc )
                      temp += temp_2d[a1][a2]*temp_2d[a1][a2];
                temp /= (float)mm2;
                costt[ii][jj][ll_log-1-i][j] = temp*c1/4.0;
                        /*divide by 4*(4*mm)**2 for 3rd
stage*/
                        /*divide by 4*(8*mm)**2 for 4th
stage*/
                        /*divide by 4*(16*mm)**2 for 5th
stage*/
                if( 0==0 ){
                  qt_codet[b2+j] = 0;
                  for( a1 = 0; a1 < trunc; a1++ )
                    for( a2 = 0; a2 < trunc; a2++ )
                      wtt[ii][jj][ll_log-i][j][a1][a2] =
temp_2d[a1][a2];
                }
              }
            }
      b1 = b2;
      b2 += j;
      c1 *= 4;
    }
  } if( k > 0 ) free( qt_codet );

for( i = 0; i < 2*mm; i++ ) free(temp_2d[i]);
  free(temp_2d);
}
```

/*qtwt_prune_costt.c: subroutine to prune the balanced quadtree in performing
            Walsh Transform Quadtree decomposition for all Nt.

Copyright
                    by Xiaonong Ran    */ void qtwt_prune_costt(
row,column,nn,mm,costt,lnn,mse,step_size,threshold )

```
float ****costt;    /* tree of merging-cost:
            index 1,2: root-blocks;
            index 3: levels of quad-trees, bottom-up;
            index 4: nodes */
int row, column;    /* frame sizes */
int mm, nn;         /* mm (nn): the size of the smallest
leaf (root) block.
            mm must be larger than size of truncated
transform blocks*/
int lnn;       /* the target number of leaf-nodes.*/
double *mse;        /* mean-squared-error of pruning. */
float step_size;    /* quantization step size for compute
threshold. */
float threshold;    /* threshold for pruning cost. */
{
    int r_nn, c_nn, ii, jj, nf, nff;
    int i, j, i3, j3, k3, jj3, j1, j2, k, l1, l2, l1_log;
    int a1, a2, b3;
    float temp, temp1, factor;

factor = 4*mm*mm;
    r_nn = row / nn;
    c_nn = column / nn;
    l1 = nn/mm;
        l2 = l1*l1;    /*number of possible leaf nodes and
the size of tran_v*/
    l1_log = (int) ( log2((double)l1) + 0.5 ); /* number
of stages after
                                    root for the quadtree*/
    *mse = 0.0;
        for( i = 0; i < row/nn; ++i ){
          for( j = 0; j < column/nn; ++j ){
            ii = l2 / 4;
            for( k = 0; k < l1_log; ++k ){
              for( jj = 0; jj < ii; ++jj ){
            if( k == 0 && costt[i][j][k][jj]<threshold ){
            *mse += costt[i][j][k][jj];
            costt[i][j][k][jj] = -costt[i][j][k][jj]-1.0;
            }
            else if( k > 0 && ( costt[i][j][k-1][jj*4] < 0
&&
                    costt[i][j][k-1][jj*4+1]<0 &&
                    costt[i][j][k-1][jj*4+2]<0 &&
                    costt[i][j][k-1][jj*4+3]<0 ) ){
            temp = costt[i][j][k][jj];
            if( temp < threshold ){
                *mse += costt[i][j][k][jj];
                costt[i][j][k][jj] =
-costt[i][j][k][jj]-1.0;
            }
            }
          }
            ii /= 4;
```

```
                }
            }
        }

*mse *= (4.0*mm*mm/(float)(row*column));
}

/*qtwt_quan_deco2D.c: subroutine to input bits, to
variable length decode them
             and to reconstruction frame; for Nt = 2;

Copyright
                       by Xiaonong Ran  */
#include "bits_to_matrix2D.c"

void qtwt_quan_deco2D(
frame,step_size,row,column,nn,mm,trunc,fp_in,seq_to_2d )
short **frame, **seq_to_2d;      /* the current (MCP)
frame */
int row, column;     /* frame sizes */
int mm, nn;          /* mm (nn): the size of the smallest
leaf (root) block.
                     mm must be larger than size of
truncated transform blocks*/
int trunc;           /* trunc: the size of truncated
transform blocks.*/
float step_size;     /* quantization step size. */
FILE *fp_in;
{
        float **temp_2d;
        short *length, *code;
    int i, j, k, ikk, ik, r_nn, c_nn, l1, l1_log, l2, ii,
jj, flag1;
        int buffer_input, bits_to_input, itemp, i2, ii3,
jj3, a1, a2, nn2;
        struct entry *treeh, *tree_builder;
    float nn4, **init_v; /*initial value of DPCM of
(0,0)th coef.;
                     may extended to other coef.s */
    float **costt;    /* index 1: levels of quad-trees,
bottom-up;
                       index 2: nodes */
        double sz_factor; /*sz_factor: step size factor.
*/

/********* temp. 2D array for blocks
**********************************/
        if( (temp_2d = (float **) calloc( nn, sizeof(float
*)))==NULL ){
                fprintf( stderr, "wc: no more memory\n" );
```

```
            exit( 0 );
        }
    for( i = 0; i < nn; i++ )
        if( (temp_2d[i] = (float *) calloc( nn,
sizeof(float)))==NULL){
            fprintf( stderr, "wc: no more memory\n" );
            exit( 0 );
        }
/*************************************************************/

/********* codes and lengths for trunc=2
*******************************/
    if( (code = (short *) calloc( 18,
sizeof(short)))==NULL ){
            fprintf( stderr, "wc: no more memory\n" );
            exit( 0 );
        }
    if( (length = (short *) calloc( 18,
sizeof(short)))==NULL ){
            fprintf( stderr, "wc: no more memory\n" );
            exit( 0 );
        }
    code[0]=1; length[0]=2;           /*      EOB     */
    code[1]=0; length[1]=3;           /*      0       */
    code[2]=1; length[2]=1;           /*      +-1     */
    code[3]=2; length[3]=4;           /*      +-2     */
    code[4]=7; length[4]=5;           /*      +-3     */
    code[5]=24; length[5]=7;          /*      +-4     */
    code[6]=50; length[6]=8;          /*      +-5     */
    code[7]=26; length[7]=7;          /*      +-6,+-7     */
11x        */
    code[8]=54; length[8]=8;          /*      +-8,+-9     */
100x       */
    code[9]=103; length[9]=9;         /*   +-10,+-11   */
101x       */
    code[10]=55; length[10]=8;        /* +-12 ... +-15 */
11xx       */
    code[11]=204; length[11]=10;      /* +-16 ... +-19 */
100xx      */
    code[12]=411; length[12]=11;      /* +-20 ... +-23 */
101xx      */
    code[13]=821; length[13]=12;      /* +-24 ... +-27 */
110xx      */
    code[14]=3282; length[14]=14;     /* +-28 ... +-31 */
111xx      */
```

```
        code[15]=1640; length[15]=13;   /* +-32 ... +-63
1xxxxx      */
        code[16]=6567; length[16]=15;   /* +-64 ... +-127
1xxxxxx     */
        code[17]=6566; length[17]=15;   /* +-128 ... +-255
1xxxxxxx    */
/***************************************************************/

/******************* building the huffman tree
**************************/
    if((treeh=(struct entry *) calloc( 1, sizeof(struct
entry)))==NULL){
            fprintf( stderr, "wc: no more memory\n" );
            exit( 0 );
    }
    for( i = 0; i < 18; i++ ){
        tree_builder = treeh;
        ikk = code[i];
        ikk <<= (32-length[i]);
        for( ik = 0; ik < length[i]; ik++ ){
            if( (ikk & 0x80000000) ){
              if( tree_builder->leaf1 == 0 )
              if((tree_builder->leaf1=(struct entry *)
                    calloc(1,sizeof(struct
entry)))==NULL){
                    fprintf( stderr, "wc: no more memory\n"
);
                    exit( 0 );
              }
              tree_builder = tree_builder->leaf1;
            }
            else {
              if( tree_builder->leaf0 == 0 )
              if((tree_builder->leaf0=(struct entry *)
                    calloc(1,sizeof(struct
entry)))==NULL){
                    fprintf( stderr, "wc: no more memory\n"
);
                    exit( 0 );
              }
              tree_builder = tree_builder->leaf0;
            }
            ikk <<= 1;
        }
        tree_builder->flag_node = 1;
        tree_builder->index = i;
    }
/******************* end of building the huffman tree
*******************/

/**************** some size-parameters
******************************/
```

```
        r_nn = row / nn;
        c_nn = column / nn;
        l1 = nn/mm;
        l2 = l1*l1;      /*number of possible leaf nodes
and the size of tran_v*/
        l1_log = (int) ( log2((double)l1) + 0.5 ); /*
number of stages after
                                                       root
for the quadtree.*/
     bits_to_input = 0;
/************************************************
***************/

/***************** one single-tree
************************************/
     if((costt=(float **)calloc(l1_log,sizeof(float
*)))==NULL){
           fprintf( stderr, "wc: no more memory\n" );
           exit( 0 );
     }
     ii = l2 / 4;
     for( k = 0; k < l1_log; ++k ){
         if((costt[k]=(float
*)calloc(ii,sizeof(float)))==NULL){
           fprintf( stderr, "wc: no more memory\n" );
           exit( 0 );
         }
         ii /= 4;
     }
/************************************************
***************/ for( i = 0; i < r_nn; ++i ){
         for( j = 0; j < c_nn; ++j ){ ii = 1;
         for( k = l1_log-1; k >-1; k-- ){   /* input
quadtree structure */
             for( jj = 0; jj < ii; ++jj ){
             if( k == l1_log-1 || costt[k+1][(int)(jj/4)] >
0 ){
                 if( bits_to_input == 0 ){         /* Read
the next byte if*/
                     buffer_input = getc( fp_in );   /* bits
are left in buffer*/
                     bits_to_input = 8;
                 }
                 if( (buffer_input & 1) ) costt[k][jj] =
1.0;
                 else costt[k][jj] = -1.0;
                 buffer_input >>= 1;
                 bits_to_input -= 1;
             }
```

```
                else costt[k][jj] = -1;
        }
            ii *= 4;
    }                      /* end of outputing quadtree */ ii = 12;        /* input codes of WT coefficients */
        nn4 = mm*mm;
    nn2 = mm;
        sz_factor = 1.0;
        for( k = 0; k <= ll_log; ++k ){
            for( jj = 0; jj < ii; ++jj ){
                if( (k == 0 || costt[k-1][jj]< 0) && ( k==
ll_log ||
                            costt[k][(int)(jj/4)] >= 0 ) ){
            if( flag1 == 0 ){
                itemp = 0;
                for( i2 = 0; i2 < 24; i2++ ){
                        if( bits_to_input == 0 ){
                            buffer_input = getc( fp_in );
                            bits_to_input = 8;
                        }
                    itemp <<= 1;
                        if( buffer_input & 1 ) itemp += 1;
                        buffer_input >>= 1;
                        bits_to_input -= 1;
                }
                temp_2d[0][0] = itemp;
                    init_v[0][0] = itemp/nn4;
            }
            bits_to_matrix2D( temp_2d, init_v, &flag1,
fp_in, code, length,
                            (step_size/sz_factor), nn4, trunc,
&buffer_input,
                            &bits_to_input, treeh );
                two_d_iwt( temp_2d, nn2, nn2, trunc,
trunc, temp_2d );
                ii3 = i*nn + seq_to_2d[jj][0]*nn2;
                jj3 = j*nn + seq_to_2d[jj][1]*nn2;
                for( a1 = 0; a1 < nn2; a1++ )
                    for( a2 = 0; a2 < nn2; a2++ )
                        frame[ii3+a1][jj3+a2] =
temp_2d[a1][a2];
            }
            }
            ii /= 4;
        nn4 *= 4;
        nn2 *= 2;
            sz_factor *= 2.0;
        if( step_size/sz_factor < 1.0 ) sz_factor =
step_size;
            }
        }
```

}
```
        for( i = 0; i < nn; i++ ) free( temp_2d[i] );
        free( temp_2d);
    for( k = 0; k < ll_log; ++k ) free( costt[k] );
    free( costt );
}
```

/*qtwt_quan_enco2D.c: subroutine to perform quantization and variable length
                encoding; for Nt = 2;

include "output_bits.c"
                        Copyright
                            by Xiaonong Ran    */
include "output_index2D.c"

```
void qtwt_quan_enco2D(
step_size,row,column,nn,mm,trunc,costt,wtt,fp_out )
int row, column;     /* frame sizes */
int mm, nn;          /* mm (nn): the size of the smallest
leaf (root) block.
                      mm must be larger than size of
truncated transform blocks*/
int trunc;           /* trunc: the size of truncated
transform blocks.*/
float step_size;     /* quantization step size. */
float ****costt;     /* tree of merging-cost:
                        index 1,2: root-blocks;
                        index 3: levels of quad-trees,
bottom-up;
                        index 4: nodes */
float ******wtt;     /* tree of Walsh transform
coefficients:
                        index 1,2: root-blocks;
                        index 3: levels of quad-trees,
bottom-up;
                        index 4: nodes
                        index 5,6: coefficient block */
FILE *fp_out;
{
        short *length, *code;
        int buffer_output, bits_to_out, **indexx;
    float nn4, **init_v; /*initial value of DPCM of
(0,0)th coef.;
                        may extended to other coef.s */
    int i, j, k, r_nn, c_nn, l1, l2, ll_log, ii, jj,
itemp, flag1;
        int a1, a2, kk, f0, i6, j6, k6, i1, i7;
        double temp, sz_factor; /*sz_factor: step size
```

```
factor. */
    float bits_tree, leaf_num, quan_freq[514], entropy;
    FILE *fp_fq_out, *fopen();

/**** initiate counter and memory for computing entropy,
etc. **********/
    bits_tree = 0;
    leaf_num = 0;
    for( i = 0; i < 514; i++ ) quan_freq[i] = 0;
/**************************************************************
**************/

/********* initiate output buffer and counter
*************************/
    buffer_output = 0;
    bits_to_out = 8;
/**************************************************************
**************/

/********* codes and lengths for trunc=2
******************************/
    if( (code = (short *) calloc( 18,
sizeof(short)))==NULL ){
            fprintf( stderr, "wc: no more memory\n" );
            exit( 0 );
    }
    if( (length = (short *) calloc( 18,
sizeof(short)))==NULL ){
            fprintf( stderr, "wc: no more memory\n" );
            exit( 0 );
    }
    code[0]=1;   length[0]=2;/* EOB*/
    code[1]=0;   length[1]=3;/*0*/
    code[2]=1;   length[2]=1;/*+-1*/
    code[3]=2;   length[3]=4;/* +-2*/
    code[4]=7;   length[4]=5;/*+-3*/
    code[5]=24;  length[5]=7;/*+-4*/
    code[6]=50;  length[6]=8;/*+-5*/
    code[7]=26;  length[7]=7;/*+-6,+-7  11x       */
    code[8]=54;  length[8]=8;/*+-8,+-9           100x*/
    code[9]=103; length[9]=9;/*    +-10,+-11           101x
*/
    code[10]=55; length[10]=8;/* +-12 ... +-15         11xx
    */
    code[11]=204; length[11]=10;/* +-16 ... +-19
100xx    */
    code[12]=411; length[12]=11;/* +-20 ... +-23
101xx    */
    code[13]=821; length[13]=12;/* +-24 ... +-27
110xx    */
    code[14]=3282; length[14]=14;/* +-28 ... +-31
111xx    */
```

```
    code[15]=1640; length[15]=13;/* +-32 ... +-63
1xxxxx     */
    code[16]=6567; length[16]=15;/* +-64 ... +-127
1xxxxxx    */
    code[17]=6566; length[17]=15;/* +-128 ... +-255
1xxxxxxx   */
/***********************************************************
**************/

/********* array memory for matrix of code-index
**********************/
    if( (indexx = (int **) calloc( trunc, sizeof(int
*)))==NULL ){
            fprintf( stderr, "wc: no more memory\n" );
            exit( 0 );
    }
    for( i = 0; i < trunc; i++ ){
        if( (indexx[i] = (int *) calloc( trunc,
sizeof(int)))==NULL){
            fprintf( stderr, "wc: no more memory\n" );
            exit( 0 );
        }
    }
/***********************************************************
**************/

/***************** some size-parameters
********************************/
    r_nn = row / nn;
    c_nn = column / nn;
    l1 = nn/mm;
    l2 = l1*l1;       /*number of possible leaf nodes
and the size of tran_v*/
    l1_log = (int) ( log2((double)l1) + 0.5 ); /*
number of stages after
                                                        root
for the quadtree.*/
/***********************************************************
****************/ for( i = 0; i < r_nn; ++i ){
          for( j = 0; j < c_nn; ++j ){
            ii = 1;
            for( k = l1_log-1; k >-1; k-- ){   /* output
quadtree structure */
                for( jj = 0; jj < ii; ++jj ){
                if( k== l1_log-1 && costt[i][j][k][jj] < 0 ){ output_bits(fp_out,&buffer_output,&bits_to_out,0,1);
                    bits_tree += 1;
                }
                else if( costt[i][j][k][jj] >= 0 ){
```

```
output_bits(fp_out,&buffer_output,&bits_to_out,1,1);
                bits_tree += 1;
        }
        else if( costt[i][j][k][jj] < 0 &&
                costt[i][j][k+1][(int)(jj/4)]>=0 ){
output_bits(fp_out,&buffer_output,&bits_to_out,0,1);
                bits_tree += 1;
        }
      }
        ii *= 4;
    }                    /* end of outputing quadtree */
        ii = 12;         /* quantizing of WT coefficients
*/
        nn4 = mm*mm;
        sz_factor = 1.0;
        for( k = 0; k <= ll_log; ++k ){
         for( jj = 0; jj < ii; ++jj ){
            if( (k == 0 || costt[i][j][k-1][jj]< 0) && (
k== ll_log ||
                     costt[i][j][k][(int)(jj/4)] >= 0
) ){
            for( a1 = 0; a1 < trunc; a1++ ){
             for( a2 = 0; a2 < trunc; a2++ )
              if( step_size > 0 ){
                temp = (wtt[i][j][k][jj][a1][a2]/nn4+
(step_size/sz_factor)/2.0)/(step_size/sz_factor);
                if( temp >= 0 ) kk = (int)(temp);
                else kk = -(int)(-temp)-1;
            indexx[a1][a2] = kk;
                quan_freq[indexx[a1][a2]+256] += 1;
             }
            else printf("!!! step_size==0 !!!\n");
           }

/*************** zigzag scaning and
encoding **************/
            k6 = 0;
            i6 = 0; j6 = 0;
        f0 = 0;
        if( indexx[i6][j6] == 0 ) f0 = 1;
        else
            output_index2D( indexx[i6][j6], fp_out, code,
length,
                     &buffer_output, &bits_to_out );
            while( i6 != trunc-1 || j6 != trunc-1 ){
               if( i6 == 0 ){
                 j6++; k6++;
                 if( indexx[i6][j6] == 0 ) f0 += 1;
             else {
               if( f0 == 1 ){
                 f0 = 0;
```

```c
output_bits(fp_out,&buffer_output,&bits_to_out,
            code[1],length[1]);
        }
        else if( f0 > 1 ){
           for( i7=0; i7<f0; i7++ )

output_bits(fp_out,&buffer_output,&bits_to_out,
            code[1],length[1]);
           f0 = 0;
        }
           output_index2D( indexx[i6][j6],
fp_out, code, length,
              &buffer_output, &bits_to_out );
        }
           for( i1 = j6-1; i1 > -1; i1-- ){
              j6--; i6++; k6++;
              if( indexx[i6][j6] == 0 ) f0 +=
1;
           else {
           if( f0 == 1 ){
              f0 = 0;

output_bits(fp_out,&buffer_output,&bits_to_out,
            code[1],length[1]);
        }
        else if( f0 > 1 ){
           for( i7=0; i7<f0; i7++ )

output_bits(fp_out,&buffer_output,&bits_to_out,
            code[1],length[1]);
           f0 = 0;
        }
           output_index2D( indexx[i6][j6],
fp_out, code, length,
              &buffer_output, &bits_to_out );
        }
      }
    }
        else if( j6 == 0 && i6 < trunc-1 ){
           i6++; k6++;
           if( indexx[i6][j6] == 0 ) f0 += 1;
        else {
        if( f0 == 1 ){
           f0 = 0;

output_bits(fp_out,&buffer_output,&bits_to_out,
            code[1],length[1]);
        }
        else if( f0 > 1 ){
           for( i7=0; i7<f0; i7++ )

output_bits(fp_out,&buffer_output,&bits_to_out,
```

```
                    code[1],length[1]);
            f0 = 0;
        }
            output_index2D( indexx[i6][j6],
fp_out, code, length,
                &buffer_output, &bits_to_out );
        }
            for( i1 = i6-1; i1 > -1; i1-- ){
                i6--; j6++; k6++;
                if( indexx[i6][j6] == 0 ) f0 +=
1;
            else {
            if( f0 == 1 ){
                f0 = 0;
output_bits(fp_out,&buffer_output,&bits_to_out,
                    code[1],length[1]);
            }
            else if( f0 > 1 ){
                for( i7=0; i7<f0; i7++ )
output_bits(fp_out,&buffer_output,&bits_to_out,
                    code[1],length[1]);
                f0 = 0;
            }
            output_index2D( indexx[i6][j6],
fp_out, code, length,
                &buffer_output, &bits_to_out );
        }
            }
        }
        else if( i6 == trunc-1 ){
            j6++; k6++;
            if( indexx[i6][j6] == 0 ) f0 += 1;
            else {
            if( f0 == 1 ){
                f0 = 0;
output_bits(fp_out,&buffer_output,&bits_to_out,
                    code[1],length[1]);
            }
            else if( f0 > 1 ){
                for( i7=0; i7<f0; i7++ )
output_bits(fp_out,&buffer_output,&bits_to_out,
                    code[1],length[1]);
                f0 = 0;
            }
            output_index2D( indexx[i6][j6],
fp_out, code, length,
                &buffer_output, &bits_to_out );
        }
            for( i1 = j6+1; i1 < trunc; i1++ ){
```

```
                    i6--; j6++; k6++;
                    if( indexx[i6][j6] == 0 ) f0 +=
1;
                else {
                if( f0 == 1 ){
                    f0 = 0;

output_bits(fp_out,&buffer_output,&bits_to_out,
                    code[1],length[1]);
                }
                else if( f0 > 1 ){
                    for( i7=0; i7<f0; i7++ )

output_bits(fp_out,&buffer_output,&bits_to_out,
                    code[1],length[1]);
                    f0 = 0;
                }
                    output_index2D( indexx[i6][j6],
fp_out, code, length,
                    &buffer_output, &bits_to_out );
                }
            }
        }
        else if( j6 == trunc-1 ){
            i6++; k6++;
            if( indexx[i6][j6] == 0 ) f0 += 1;
        else {
        if( f0 == 1 ){
            f0 = 0;

output_bits(fp_out,&buffer_output,&bits_to_out,
                    code[1],length[1]);
        }
        else if( f0 > 1 ){
            for( i7=0; i7<f0; i7++ )

output_bits(fp_out,&buffer_output,&bits_to_out,
                    code[1],length[1]);
            f0 = 0;
        }
                    output_index2D( indexx[i6][j6],
fp_out, code, length,
                    &buffer_output, &bits_to_out );
        }
            for( i1 = i6+1; i1 < trunc; i1++ ){
                i6++; j6--; k6++;
                if( indexx[i6][j6] == 0 ) f0 +=
1;
            else {
            if( f0 == 1 ){
                f0 = 0;

output_bits(fp_out,&buffer_output,&bits_to_out,
```

```c
                    code[1],length[1]);
                }
                else if( f0 > 1 ){
                    for( i7=0; i7<f0; i7++ )
output_bits(fp_out,&buffer_output,&bits_to_out,
                    code[1],length[1]);
                    f0 = 0;
                }
                output_index2D( indexx[i6][j6],
fp_out, code, length,
                    &buffer_output, &bits_to_out );
            }
          }
        }
      }
      if( f0 > 0 && trunc > 1 ){
output_bits(fp_out,&buffer_output,&bits_to_out,
                    code[0],length[0]);
            quan_freq[0+256] -= f0; /* substract
the counts for 0's
                    in EOBs */
            quan_freq[0] += 1;
      }
      /********** end of zigzag scaning and encoding
**************/
    }
   }
      ii /= 4;
   nn4 *= 4;
      sz_factor *= 2.0;
      if( step_size/sz_factor < 1.0 ) sz_factor =
step_size;
    }
   }
  } if( bits_to_out < 8 ){
        buffer_output >>= bits_to_out;
        i = buffer_output;      /*Output the last byte.
*/
        putc(i,fp_out);
   } for( i = 0; i < 514; i++ )
        leaf_num += quan_freq[i];
   entropy = 0.0;
   for( i = 0; i < 514; i++ ){
        if( quan_freq[i] > 0 ){
            quan_freq[i] /= leaf_num;
            entropy -=
quan_freq[i]*log2((double)quan_freq[i]);
```

```
            }
        }
        printf("entropy bytes= %f\n",
(entropy*leaf_num+bits_tree)/8.0 );

for( i = 0; i < trunc; i++ ) free( indexx[i] );
        free(indexx);
        free( code );
        free( length );
}

/*two_d_wt.c: subroutine to perform complete fast
recursive 2-D Walsh Transform.

Copyright
                        by Xiaonong Ran    */ void two_d_wt( data_in, row_size, col_size, trunc_r,
trunc_c, trans_out )
float **data_in;        /* 2-D data array in.*/
int row_size, col_size;  /* row # and column # of the 2-D
data array.*/
int trunc_r, trunc_c;   /* row # and column # of trans.
coeff. to be computed.*/
float **trans_out;      /* 2-D transform coefficient
array out.*/
{
    float *temp;
    int i, j;

if( row_size == 1 && col_size == 1 ){
        trans_out[0][0] = data_in[0][0];
        return;
    } if( (temp = (float *) calloc( col_size,
sizeof(float)))==NULL ){
                fprintf( stderr, "wc: no more memory\n" );
                exit( 0 );
        }
    for( i = 0; i < row_size; i++ ){
        for( j = 0; j < col_size; j++ ) temp[j] =
data_in[i][j];
        one_d_wt( temp, col_size, trunc_c, temp );
        for( j = 0; j < trunc_c; j++ ) data_in[i][j] =
temp[j];
    } free( temp );
```

```c
        if( (temp = (float *) calloc( row_size,
sizeof(float)))==NULL ){
                fprintf( stderr, "wc: no more memory\n" );
                exit( 0 );
        }
        for( i = 0; i < trunc_c; i++ ){
            for( j = 0; j < row_size; j++ ) temp[j] =
data_in[j][i];
            one_d_wt( temp, row_size, trunc_r, temp );
            for( j = 0; j < trunc_r; j++ ) trans_out[j][i] =
temp[j];
        } free( temp );
}

/*two_d_wt.c: subroutine to perform complete fast
recursive 2-D Walsh Transform.

Copyright
                        by Xiaonong Ran   */ void two_d_wt( data_in, row_size, col_size, trunc_r,
trunc_c, trans_out )
float **data_in;        /* 2-D data array in.*/
int row_size, col_size;    /* row # and column # of the 2-D
data array.*/
int trunc_r, trunc_c;      /* row # and column # of trans.
coeff. to be computed.*/
float **trans_out;         /* 2-D transform coefficient
array out.*/
{
        float *temp;
        int i, j;

if( row_size == 1 && col_size == 1 ){
            trans_out[0][0] = data_in[0][0];
            return;
        } if( (temp = (float *) calloc( col_size,
sizeof(float)))==NULL ){
                fprintf( stderr, "wc: no more memory\n" );
                exit( 0 );
        }
        for( i = 0; i < row_size; i++ ){
            for( j = 0; j < col_size; j++ ) temp[j] =
data_in[i][j];
            one_d_wt( temp, col_size, trunc_c, temp );
            for( j = 0; j < trunc_c; j++ ) data_in[i][j] =
```

```
        temp[j];
        } free( temp );

if( (temp = (float *) calloc( row_size,
sizeof(float)))==NULL ){
            fprintf( stderr, "wc: no more memory\n" );
            exit( 0 );
        }
    for( i = 0; i < trunc_c; i++ ){
        for( j = 0; j < row_size; j++ ) temp[j] =
data_in[j][i];
        one_d_wt( temp, row_size, trunc_r, temp );
        for( j = 0; j < trunc_r; j++ ) trans_out[j][i] =
temp[j];
        } free( temp );
}

/*two_d_wt_rc.c: subroutine to perform single step fast
2-D RECURSIVE Walsh
        Transform.
                            Copyright
                        by Xiaonong Ran    */ void two_d_wt_rc_1i( data_in1_1, data_in1_2, data_in2_1,
data_in2_2,
            row_size, col_size, trunc_r, trunc_c,
trans_out )
float **data_in1_1, **data_in1_2, **data_in2_1,
**data_in2_2;
                /* Four 2-D data sub-arrays in.*/
int row_size, col_size;   /* row # and column # of the 2-D
data array.*/
int trunc_r, trunc_c;     /* row # and column # of trans.
coeff. to be computed.*/
float **trans_out;        /* 2-D transform coefficient
array out.*/
{
    float *temp1, *temp2, *temp_out, **temp_out1,
**temp_out2;
    int i, j, trunc_r0, trunc_c0;

trunc_r0 = (trunc_r-1)/2+1;
    trunc_c0 = (trunc_c-1)/2+1;
    if( trunc_r == 0 ) trunc_r0 = 0;
    if( trunc_c == 0 ) trunc_c0 = 0;
```

```
    if( (temp1 = (float *) calloc( trunc_c0,
sizeof(float)))==NULL ){
            fprintf( stderr, "wc: no more memory\n" );
            exit( 0 );
    }
    if( (temp2 = (float *) calloc( trunc_c0,
sizeof(float)))==NULL ){
            fprintf( stderr, "wc: no more memory\n" );
            exit( 0 );
    }
    if( (temp_out1 = (float **) calloc( trunc_r0,
sizeof(float *)))==NULL ){
            fprintf( stderr, "wc: no more memory\n" );
            exit( 0 );
    }
    for( i = 0; i < trunc_r0; i++ ){
        if((temp_out1[i]=(float *)calloc( trunc_c,
sizeof(float)))==NULL){
            fprintf( stderr, "wc: no more memory\n" );
            exit( 0 );
        }
    }
    if( (temp_out2 = (float **) calloc( trunc_r0,
sizeof(float *)))==NULL ){
            fprintf( stderr, "wc: no more memory\n" );
            exit( 0 );
    }
    for( i = 0; i < trunc_r0; i++ ){
        if((temp_out2[i]=(float *)calloc( trunc_c,
sizeof(float)))==NULL){
            fprintf( stderr, "wc: no more memory\n" );
            exit( 0 );
        }
    } for( i = 0; i < trunc_r0; i++ ){
        for( j = 0; j < trunc_c0; j++ ) {
            temp1[j] = data_in1_1[i][j];
            temp2[j] = data_in1_2[i][j];
        }
        one_d_wt_rc( temp1, temp2, col_size, trunc_c,
temp_out1[i] );
        for( j = 0; j < trunc_c0; j++ ) {
            temp1[j] = data_in2_1[i][j];
            temp2[j] = data_in2_2[i][j];
        }
        one_d_wt_rc( temp1, temp2, col_size, trunc_c,
temp_out2[i] );
    } free( temp1 );
    free( temp2 );
```

```
        if( (temp1 = (float *) calloc( trunc_r0,
sizeof(float)))==NULL ){
                fprintf( stderr, "wc: no more memory\n" );
                exit( 0 );
        }
        if( (temp2 = (float *) calloc( trunc_r0,
sizeof(float)))==NULL ){
                fprintf( stderr, "wc: no more memory\n" );
                exit( 0 );
        } if( (temp_out = (float *) calloc( trunc_r,
sizeof(float)))==NULL ){
                fprintf( stderr, "wc: no more memory\n" );
                exit( 0 );
        } for( i = 0; i < trunc_c; i++ ){
        for( j = 0; j < trunc_r0; j++ ) {
           temp1[j] = temp_out1[j][i];
           temp2[j] = temp_out2[j][i];
        }
        one_d_wt_rc( temp1, temp2, row_size, trunc_r,
temp_out );
        for( j = 0; j < trunc_r; j++ )
            trans_out[j][i] = temp_out[j];
    } free( temp1 );
    free( temp2 );
    free( temp_out );
    for( i = 0; i < trunc_r0; i++ ) free( temp_out1[i] );
        free( temp_out1 );
    for( i = 0; i < trunc_r0; i++ ) free( temp_out2[i] );
        free( temp_out2 );
} void two_d_wt_rc( data_in, row_size, col_size, trunc_r,
trunc_c, trans_out )
float **data_in;        /* 2-D data array in.*/
int row_size, col_size;   /* row # and column # of the 2-D
data array.*/
int trunc_r, trunc_c;     /* row # and column # of trans.
coeff. to be computed.*/
float **trans_out;      /* 2-D transform coefficient
array out.*/
{
    int row_size0, col_size0, trunc_r0, trunc_c0;
    float **data1_1, **data1_2, **data2_1, **data2_2;
    int i, j;

row_size0 = row_size/2;
    col_size0 = col_size/2;
```

```c
        trunc_r0 = (trunc_r-1)/2+1;
        trunc_c0 = (trunc_c-1)/2+1;
        if( trunc_r == 0 ) trunc_r0 = 0;
        if( trunc_c == 0 ) trunc_c0 = 0;

if( row_size >= 2 && col_size >= 2 ){
            if((data1_1 = (float **)calloc( row_size0,
sizeof(float *)))==NULL){
                    fprintf( stderr, "wc: no more memory\n" );
                    exit( 0 );
            }
            for( i = 0; i < row_size0; i++ ){
                if((data1_1[i]=(float
*)calloc(col_size0,sizeof(float)))==NULL){
                    fprintf( stderr, "wc: no more memory\n" );
                    exit( 0 );
                }
            }
            if((data1_2 = (float **)calloc( row_size0,
sizeof(float *)))==NULL){
                    fprintf( stderr, "wc: no more memory\n" );
                    exit( 0 );
            }
            for( i = 0; i < row_size0; i++ ){
                if((data1_2[i]=(float
*)calloc(col_size0,sizeof(float)))==NULL){
                    fprintf( stderr, "wc: no more memory\n" );
                    exit( 0 );
                }
            }
            if((data2_1 = (float **)calloc( row_size0,
sizeof(float *)))==NULL){
                    fprintf( stderr, "wc: no more memory\n" );
                    exit( 0 );
            }
            for( i = 0; i < row_size0; i++ ){
                if((data2_1[i]=(float
*)calloc(col_size0,sizeof(float)))==NULL){
                    fprintf( stderr, "wc: no more memory\n" );
                    exit( 0 );
                }
            }
            if((data2_2 = (float **)calloc( row_size0,
sizeof(float *)))==NULL){
                    fprintf( stderr, "wc: no more memory\n" );
                    exit( 0 );
            }
            for( i = 0; i < row_size0; i++ ){
                if((data2_2[i]=(float
*)calloc(col_size0,sizeof(float)))==NULL){
                    fprintf( stderr, "wc: no more memory\n" );
                    exit( 0 );
                }
```

```
            }
        for( i = 0; i < row_size0; i++ )
            for( j = 0; j < col_size0; j++ ){
                data1_1[i][j] = data_in[i][j];
                data1_2[i][j] = data_in[i][j+col_size0];
                data2_1[i][j] = data_in[i+row_size0][j];
                data2_2[i][j] =
data_in[i+row_size0][j+col_size0];
            } two_d_wt_rc(data1_1,row_size0,col_size0,trunc_r0,trunc_c0,
data1_1);

two_d_wt_rc(data1_2,row_size0,col_size0,trunc_r0,trunc_c0,
data1_2);

two_d_wt_rc(data2_1,row_size0,col_size0,trunc_r0,trunc_c0,
data2_1);

two_d_wt_rc(data2_2,row_size0,col_size0,trunc_r0,trunc_c0,
data2_2);
            two_d_wt_rc_1i( data1_1, data1_2, data2_1, data2_2,
                row_size, col_size, trunc_r, trunc_c,
trans_out );
        }
        else
            return;
}
```

We claim:

1. A video coder comprising:

a memory;

means for creating a quadtree code representing a partition of a two-dimensional array of values stored in the memory, the quadtree code containing embedded Walsh transform coefficients of blocks in the partition, wherein the means for creating the quadtree code comprises:

means for generating a quadtree partition of the two-dimensional array, the quadtree partition consisting of blocks from a series of partitions of the two-dimensional array, each partition in the series having a corresponding integer I with $N \leq I < M$ and containing $4^I$ non-intersecting blocks of values from the two-dimensional array, wherein N and M are integers with $N < M$, and for each integer J with $N \leq J < M$, each block in a partition corresponding to integer J equals a union of four blocks in a partition corresponding to an integer $J+1$;

means for generating a code that indicates which blocks from the series of partitions are in the quadtree partition of the two-dimensional array; and means for generating Walsh transform coefficients for each block in the quadtree partition and embedding the generated Walsh transform coefficients in the code which indicates the quadtree partition;

means for guantizing the Walsh transform coefficients embedded in the quadtree code; and means for variable length coding the quantized Walsh transform coefficients.

2. The video coder of claim 1, further comprising:

a first frame buffer for holding a first pixel map describing a first video image;

a second frame buffer for holding a second pixel map describing a second video image; and means for generating and storing in the memory a two-dimensional array of values representing the difference between the first video image and the second video image.

3. The video coder of claim 2, wherein the means for generating a two-dimensional array comprises:

a motion estimation block which determines an average shift between values in the first pixel map and values in the second pixel map; and means for subtracting the first pixel map from the second pixel map, wherein the first pixel map and the second pixel are shifted relative to each other by an amount determine by the motion estimation block.

4. The video coder of claim 1, wherein the means for quantizing comprises means for dividing Walsh coefficients of a first block in the quadtree partition by a first constant which indicates a uniform quantization steep size.

5. The video coder of claim 4, wherein the means for quantizing comprises means for dividing Walsh coefficients of a second block in the quadtree partition by a second constant which indicates a second uniform quantization step size wherein the first block contains more values than does the second block, and the first constant differs from the second constant.

6. The video coder of claim 4, further comprising means for determining a difference between a first Walsh coefficient of the first block and a corresponding Walsh coefficient of a second block and then dividing the difference by the first constant.

7. A video coder comprising:
a memory;
a processor which creates a quadtree code representing a partition of a two-dimensional array of values stored in the memory, the quadtree code containing embedded quantized Walsh transform coefficients of blocks in the partition, wherein the processor comprises:
means for generating a quadtree partition of the two-dimensional array, the quadtree partition consisting of blocks from a series of partitions of the two-dimensional array, each partition in the series having a corresponding integer I with $N \leq I \leq M$ and containing $4^I$ non-intersecting blocks of values from the two-dimensional array, wherein N and M are integers with $N < M$ and for each integer J with $N \leq J < M$, each block in a partition corresponding to integer J equals a union of four blocks in a partition corresponding to an integer $J+$;
means for generating a code which indicates which of the blocks from the series of partitions are in the quadtree partition of the two-dimensional array; and
means for generating Walsh transform coefficients for each block in the quadtree partition and embedding the generated Walsh transform coefficients in the code which indicates the quadtree partition; and
a source encoder which variable length codes the quantized Walsh transform coefficients.

8. The video coder of claim 7, wherein the processor further comprises means for quantizing Walsh transform coefficients of blocks, wherein all of the quantized Walsh coefficients for a block are quantized using a single predetermined constant which indicates a uniform quantization step size.

9. The video coder of claim 8, wherein the means for quantizing Walsh transform coefficients quantizes Walsh coefficient of a first block according to the first predetermined constant and quantizes Walsh coefficient of a second block according to a second constant which indicates a second uniform quantization step size, wherein the second constant differs from the first constant.

10. The video coder of claim 8, further comprising means for determining a difference between a Walsh coefficient of the first block and a corresponding Walsh coefficient of a second block and then quantizing the difference according to the first constant.

11. A method for encoding a video image, comprising the steps of:
storing in a memory, a two-dimensional array of values representing pixels of the video image;
partitioning the two-dimensional array into a quadtree partition, the quadtree partition consisting of blocks from a series of partitions of the two-dimensional array, each partition in the series having a corresponding integer I with $N \leq I \leq M$ and containing $4^J$ non-intersecting blocks of values from the two-dimensional array, wherein N and M are integers with $N < M$ and for each integer J with $N \leq J < M$, each block in a partition corresponding to integer J equals a union of four blocks in a partition corresponding to an integer $J+1$;
generating a code which indicates which of the blocks of the series of partitions are in the quadtree partition of the two-dimensional array;
generating Walsh transform coefficients for each block in the quadtree partition;
quantizing Walsh transform coefficients of a first block in the quadtree partition by dividing the Walsh transform coefficients of the first block by a first constant that indicates a uniform quantization step size; and
embedding the quantized Walsh transform coefficients in the code which indicates the quadtree partition.

12. The method of claim 11, further comprising the step of quantizing Walsh transform coefficients of a second block in the quadtree partition by dividing the Walsh transform coefficients of the second block by a second constant that indicates a second uniform quantization step size; wherein the first block contains fewer values than does the second block, and the first constant differs from the second constant.

13. The method of claim 11, further comprising the steps of:
determining a difference between a Walsh transform coefficient of the first block and a corresponding Walsh transform coefficient of a second block;
quantizing the difference by dividing the difference by the first constant; and
embedding the quantized difference in the code which indicates the quadtree partition.

14. The method of claim 13, further comprising the step of variable length coding the quantized Walsh transform coefficients and the quantized difference before embedding the quantized Walsh transform coefficients and the quantized difference in the code which indicates the quadtree partition.

15. The method of claim 11, wherein the video image being encoded is a difference frame.

16. The method of claim 11, wherein the embedding step comprises embedding in the code Walsh transform coefficients for a first block in the quadtree partition, wherein a total number of Walsh transform coefficients embedded in the code, for the first block is fewer than a total number of values in the first block.

* * * * *

UNITED STATES PATENT AND TRADEMARK OFFICE
CERTIFICATE OF CORRECTION

PATENT NO.   :   5,446,806
DATED        :   August 29, 1995
INVENTOR(S)  :   Ran et al.

It is certified that error appears in the above-identified patent and that said Letters Patent is hereby corrected as shown below:

Col. 6, line 24, after "branches" insert --in the--.

Col. 7, line 7, after "(2)" insert --|--.

Col. 7, line 7, delete "(1333)" and insert --(01333)--.

Col. 8, line 49, delete ".".

Col. 9, line 65, delete part of equation "$A^T Z+1$" and insert $A_Z+1^T$--.

Col. 10, line 2, delete "by" and delete second occurrence of "of" and insert --by--.

Col. 11, line 62, delete "amountof" and insert --amount of--.

Col. 12, line 32, delete "subimages" and insert --sub-images--.

Col. 14, line 20, delete "qUadtree" and insert --quadtree---.

Col. 105, line 51, delete "$N \leq I < M$" and insert --$N \leq I \leq M$--.

Col. 105, line 65, delete "guantizing" and insert --quantizing--.

UNITED STATES PATENT AND TRADEMARK OFFICE
CERTIFICATE OF CORRECTION

PATENT NO. : 5,446,806
DATED : August 29, 1995
INVENTOR(S) : Ran et al.

It is certified that error appears in the above-indentified patent and that said Letters Patent is hereby corrected as shown below:

Col. 106, line 60, delete "steep" and insert --step--.

Signed and Sealed this

Fourteenth Day of May, 1996

Attest:

BRUCE LEHMAN

Attesting Officer    Commissioner of Patents and Trademarks